US011995120B1

(12) United States Patent
Kirke

(10) Patent No.: US 11,995,120 B1
(45) Date of Patent: May 28, 2024

(54) APPARATUS AND METHOD FOR GENERATION OF AN INTEGRATED DATA FILE

(71) Applicant: ClioTech Ltd, Manchester (GB)

(72) Inventor: Georgia Helen Kirke, Kent (GB)

(73) Assignee: ClioTech Ltd, Manchester (GB)

( * ) Notice: Subject to any disclaimer, the term of this patent is extended or adjusted under 35 U.S.C. 154(b) by 0 days.

(21) Appl. No.: 18/367,738

(22) Filed: Sep. 13, 2023

(51) Int. Cl.
*G06F 16/00* (2019.01)
*G06F 16/538* (2019.01)
*G06F 16/55* (2019.01)
*G06N 20/00* (2019.01)

(52) U.S. Cl.
CPC ............ *G06F 16/55* (2019.01); *G06F 16/538* (2019.01); *G06N 20/00* (2019.01)

(58) Field of Classification Search
CPC ........ G06F 16/55; G06F 16/538; G06N 20/00
See application file for complete search history.

(56) References Cited

U.S. PATENT DOCUMENTS

| 10,740,064 | B1* | 8/2020 | Reddy | G11B 27/031 |
|---|---|---|---|---|
| 2002/0033090 | A1* | 3/2002 | Iwamoto | G10H 1/0025 |
| | | | | 84/609 |
| 2005/0091057 | A1* | 4/2005 | Phillips | G10L 15/30 |
| | | | | 704/E15.047 |
| 2005/0261907 | A1* | 11/2005 | Smolenski | G10L 15/26 |
| | | | | 704/E15.04 |
| 2008/0242221 | A1* | 10/2008 | Shapiro | H04W 4/029 |
| | | | | 455/3.06 |
| 2008/0242280 | A1* | 10/2008 | Shapiro | H04N 21/6131 |
| | | | | 455/414.3 |
| 2008/0294479 | A1* | 11/2008 | Emling | G06Q 30/04 |
| | | | | 707/999.01 |
| 2009/0003698 | A1* | 1/2009 | Milward | G06T 7/12 |
| | | | | 382/171 |
| 2013/0111373 | A1* | 5/2013 | Kawanishi | H04N 1/3873 |
| | | | | 715/762 |
| 2015/0294349 | A1* | 10/2015 | Capel | H04W 4/02 |
| | | | | 705/14.43 |
| 2020/0014820 | A1* | 1/2020 | Imaizumi | H04N 1/4072 |
| 2020/0326901 | A1* | 10/2020 | Mitsubuchi | G06F 3/1454 |
| 2022/0309543 | A1* | 9/2022 | Kushner | G06Q 30/0276 |

FOREIGN PATENT DOCUMENTS

| CN | 110377890 A | 10/2019 |
|---|---|---|
| CN | 113301268 A | 8/2021 |

* cited by examiner

*Primary Examiner* — Jared M Bibbee
(74) *Attorney, Agent, or Firm* — Caldwell Intellectual Property Law

(57) ABSTRACT

An apparatus for generation of an integrated data file, wherein the apparatus includes at least a processor and a memory communicatively connected to the at least a processor, the memory containing instructions configuring the at least a processor to receive content data from a user, receive preference data from the user as a function of receipt of the content data, create a plurality of templates as a function of the preference data and the content data, receive user feedback associated with the plurality of templates, generate one or more updated templates as function of the user feedback and the plurality of templates, generate an integrated data file as a function of one or more updated templates and transmit the integrated data file to one or more content producers.

20 Claims, 8 Drawing Sheets

APPARATUS AND METHOD FOR GENERATION OF AN INTEGRATED DATA FILE

FIELD OF THE INVENTION

The present invention generally relates to the field of data generation. In particular, the present invention is directed to the generation of integrated data files.

BACKGROUND

Current systems used to generate integrated data files lack the functionality to generate templates that are user specific. Additionally, current systems used to generate templates lack the functionality to reiteratively update templates based on user feedback.

SUMMARY OF THE DISCLOSURE

In an aspect, an apparatus for generation of an integrated data file is described. The apparatus includes at least a processor and a memory communicatively connected to the at least a processor. The memory contains instructions configuring the at least a processor to receive content data from a user, receive preference data from the user as a function of receipt of the content data, create a plurality of templates as a function of the preference data and the content data, receive user feedback associated with the plurality of templates, generate one or more updated templates as function of the user feedback and the plurality of templates, generate an integrated data file as a function of one or more updated templates and transmit the integrated data file to one or more content producers.

In another aspect, a method for generation of an integrated data file is described. The method includes receiving, by at least a processor, content data from a user, receiving, by the at least a processor, preference data from the user as a function of receipt of the content data, creating, by the at least a processor, a plurality of templates as a function of the preference data and the content data, receiving, by the at least a processor, user feedback associated with the plurality of templates, generating, by the at least a processor, one or more updated templates as function of the user feedback and the plurality of templates, generating, by the at least a processor, an integrated data file as a function of one or more updated templates and transmitting, by the at least a processor, the integrated data file to one or more content producers.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for generation of integrated data files. In an embodiment, apparatus includes a computing device configured to generate templates. In one or more embodiments, apparatus includes a content module to process content data and a template module to generate templates using content data and/or processed content data. Aspects of the present disclosure can be used to generate template using machine learning. Aspects of the present disclosure can further be used to create transitions between templates to allow for coherency between two templates. Exemplary embodiments illustrating aspects of the present disclosure are described below in the context of several specific examples.

Figure 1:
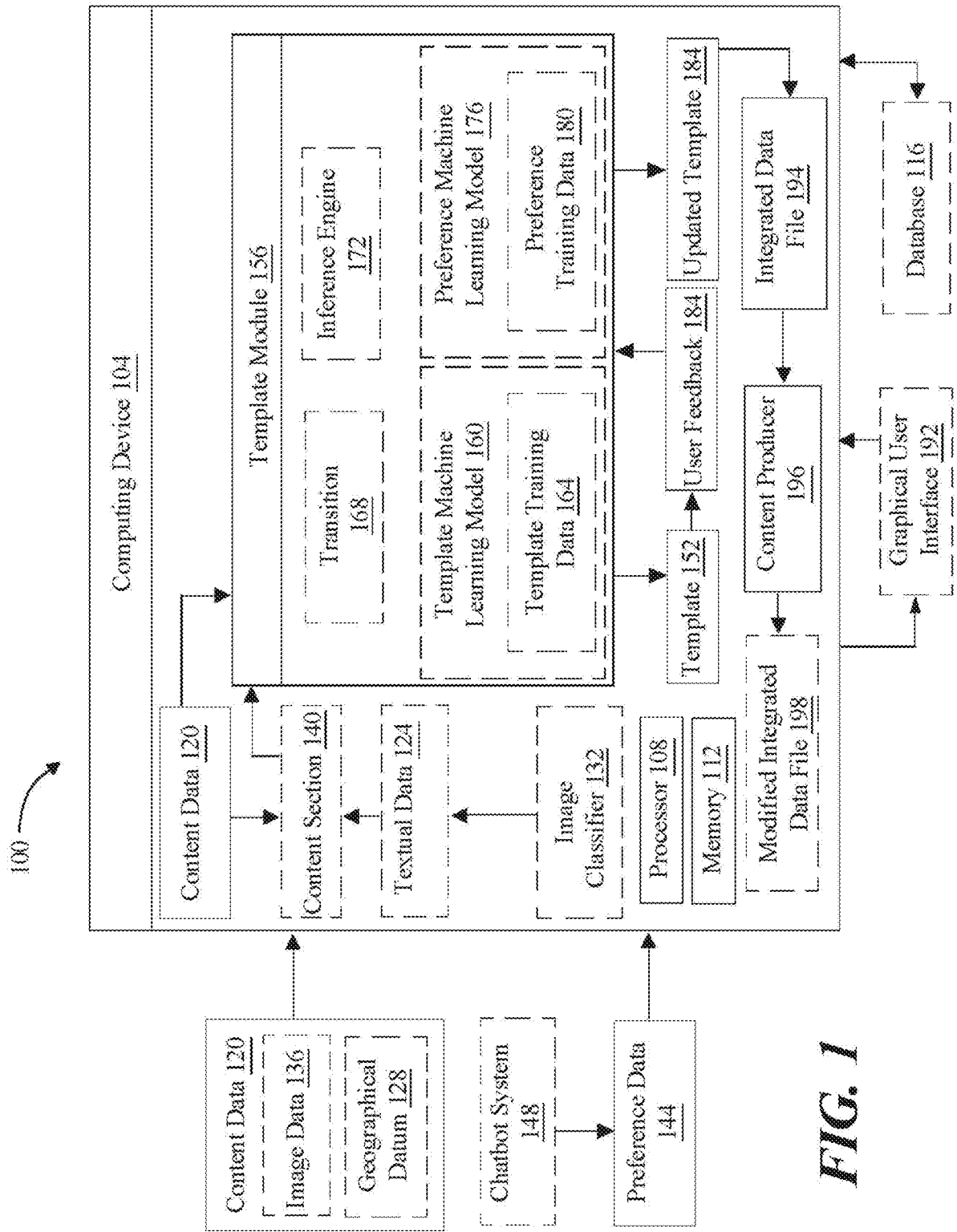
FIG. 1 is a block diagram of an exemplary embodiment of an apparatus for generation of an integrated data file.

Referring now to FIG. 1, apparatus 100 for generation of an integrated data file is described. Apparatus 100 includes a computing device 104. Apparatus 100 includes a processor 108. Processor 108 may include, without limitation, any processor 108 described in this disclosure. Processor 108 may be included in a and/or consistent with computing device 104. Computing device 104 may include any computing device as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device 104 operating independently or may include two or more computing devices operating in concert, in parallel, sequentially or the like; two or more computing devices may be included together in a single computing device 104 or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device 104. Computing device 104 may include but is not limited to, for example, a computing device 104 or cluster of computing devices in a first location and a second computing device 104 or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device 104, which may operate in parallel, in series, redundantly, or in any other manner used for distribution of tasks or memory 112 between computing devices. Computing device 104 may be implemented, as a non-limiting example, using a "shared nothing" architecture.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device 104 may perform determinations, classification, and/or analysis steps, methods, processes, or the like as described in this disclosure using machine-learning processes. A "machine-learning process," as used in this disclosure, is a process that automatedly uses a body of data known as "training data" and/or a "training set" (described further below in this disclosure) to generate an algorithm that will be performed by a Processor module to produce outputs given data provided as inputs; this is in contrast to a non-machine learning software program where the commands to be executed are determined in advance by a user and written in a programming language. A machine-learning process may utilize supervised, unsupervised, lazy-learning processes and/or neural networks, described further below.

With continued reference to FIG. 1, apparatus 100 includes a memory 112 communicatively connected to processor 108. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, using a bus or other facility for intercommunication between elements of a computing device 104. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Still referring to FIG. 1, apparatus 100 may include a database 116. Database may include a remote database 116. Database 116 may be implemented, without limitation, as a relational database, a key-value retrieval database such as a NOSQL database, or any other format or structure for use as database that a person skilled in the art would recognize as suitable upon review of the entirety of this disclosure. Database may alternatively or additionally be implemented using a distributed data storage protocol and/or data structure, such as a distributed hash table or the like. Database 116 may include a plurality of data entries and/or records as described above. Data entries in database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in database may store, retrieve, organize, and/or reflect data and/or records.

With continued reference to FIG. 1, processor 108 is configured to receive content data 120 from a user. "Content data" for the purposes of this disclosure is a collection of related information that may be used to write a book, draft a newspaper article, draft a research paper, or generate any literary works. In one or more embodiments, content data 120 may be used to generate a book, an article in a newspaper, a research paper, a poem, and/or any other textual data 124. "Textual data" for the purposes of this disclosure is information that is stored in a written format. In one or more embodiments, content data 120 may be used to generate and/or modify images that are associated with the literary work. This may include descriptive examples, figures, correlated images, and the like. "User" for the purposes of this disclosure is an individual who is interacting with apparatus and associated with the information within content data 120. In one or more embodiments, user may include an individual who has generated content data 120. In one or more embodiments, user may include an author, a researcher, a scientist, a doctor and/or any other individual who may generate content data 120. "Literary work" for the purposes of this disclosure is any creation that conveys ideas, emotions, knowledge, or experiences. In one or more embodiments, literary work may include a fictional story. In one or more embodiments, literary work may include an autobiography, a book on history, a book on science, a children's book and the like. In one or more embodiments, literary work may include textual works, in the form of words. In one or more embodiments, literary works may include graphical works, in the form of images and/or representations. In one or more embodiments, literary works may include images, figures, and the like that contain accompanying textual work.

With continued reference to FIG. 1, content data 120 may include any information necessary to write a book, draft a newspaper article, draft a research paper, or generate any literary works. In one or more embodiments, content data 120 may include information that the user would like to convey in their literary work. This may include but is not limited to, research on a particular topic, characters or individuals associated with the literary work, facts pertaining to the literary work, settings (e.g. the time place and duration), a plot, dialogue, writing style, narrative, themes, typography, genre, images associated with the work, information describing the images, and/or any other information that may be needed to describe a literary work. In one or more embodiments, content data 120 may include information in the form of bullet points, written paragraphs, images, image descriptions documents and the like. In one or more embodiments, information within content data 120 may be described in order such as in a sequence of events. In one or more embodiments, computing device 104 may receive content data 120 from user in a specific order wherein the user seeks to have information presented in a specific order. In one or more embodiments, computing device 104 may receive content data 120 wherein elements of content data 120 have little or no initial relation. For example, content data 120 may include characters that have no initial relation to one another, several plots that have do not have an initial relation to one another and the like. "Element" for the purposes of this disclosure refers to a portion of content data 120. In one or more embodiments, content data 120 may include a plurality of elements wherein each element may contain a single word, a paragraph of related information, a section of related information and the like. In one or more embodiments, content data 120 may include one or more elements wherein each element may be associated with a single scene. "Scene" for the purposes of this disclosure is an individual portion of a literary work where a specific event, action, or conversation take place. In one or more embodiments, scene may depict a particular unit of time, a particular chapter of a literary work, a paragraph, a section of article (e.g. abstract, conclusion, etc.) and the like. In one or more embodiments, content data 120 may include a plurality of scenes wherein each element includes a scene. In one or more embodiments, computing device 104 may receive a plurality of scenes from a user, wherein each scene may be used for a portion of the literary work. In one or more embodiments, content data 120 may include images, digital files, scanned documents, and the like. In one or more embodiments, content data 120 may include metadata. "Metadata" for the purposes of this disclosure is information associated with the source of content data 120. For example, metadata may include an author wherein the author may be associated with the information within content data. In one or more embodiments, metadata may include a name for the literary work, such as a title, a title for each paragraph, individuals associated with information within content data, sources cited for any information within content data that has been retrieved from other sources and the like.

With continued reference to FIG. 1, content data 120 may include information associated with the producer of content data 120, such as, for example, user. In one or more embodiments, apparatus may include a user profile. "User profile" for the purposes of this disclosure is information associated with the producer of content data. In one or more embodiments, content data 120 and/or user profile may include basic background information such as name, age, educational background, accomplishments and the like. In one or more embodiments, content data 120 and/or user profile may include geographical datum 128. "Geographical datum" for the purposes of this disclosure is information associated with a location of user. In one or more embodiments, geographical datum 128 may include the city, state, and/or country of residence. In one or more embodiments, geographical datum 128 may include a location in which user would like to publish their literary work. In one or more embodiments, geographical datum 128 may include data, wherein geographical datum 128 may include one or more locations in which user would seek to publish their literary work. In one or more embodiments, content data 120 and/or user profile may include contact information such as, and without limitation, an email address, a mailing address, a phone number and the like. In one or more embodiments, user profile and/or content data 120 may include financial information such as, but not limited to, credit card information, banking information and/or any other form of currency that may be used to make purchases. In one or more embodiments, content data 120 and/or user profile may include any information necessary to produce one or more literary works generated as a function of the processing as will be described in further detail below. In one or more embodiments, user profile may include information about an entity associated with content data 120. "Entity" for the purposes of this disclosure, is an organization comprised of one or more persons with a specific purpose. An entity may include a corporation, organization, business, group one or more persons, and the like. In one or more embodiments, user profile may include information about the entity such as individuals acting on behalf of the entity, geographical locations in which the entity conducts business, and the like. In one or more embodiments, geographical datum 128 may include an address of the entity, a location of the headquarters, a location of one or more offices, one or more locations in which the entity conducts business, one or more geographic areas in which the entity would like to conduct business and the like. In one or more embodiments, user profile may further include a preference a user has with respect to literary styles. This may include, but is not limited to, literary styles such as various tones used, target audiences, and the like. In one or more embodiments, user profile may further include preferences a user has with respect to genres of literary works. This may include but is not limited to, self help books, advice books, autobiographies, business to business books and the like.

With continued reference to FIG. 1, content data 120 may be retrieved from a remote device. A "remote device," for the purposes of this disclosure, is a device that is not physically connected with apparatus but is able to communicate with apparatus by way of a communications network. In some embodiments, remote device may include Internet of Things (IoT) devices. An "IoT device," for the purposes of this disclosure, are devices that form a collective network of connected devices that facilitates communication between the devices. Remote devices may, as non-limiting examples, include a smartwatch, wearable devices, a smart phone, a desktop computer, a smart tablet, laptop computer and the like. In one or more embodiments, content data 120 may be transmitted from remote device to database 116 wherein processor 108 may be configured to retrieve content data 120. In one or more embodiments, content data 120 may be retrieved by a chatbot system 148, wherein the chatbot system 148 is described in further detail below. In one more embodiment, the chatbot system 148 may be configured to receive textual data 124, files, images and the like.

With continued reference to FIG. 1, content data 120 may be received through an input device, such as an audio input device. In one or more embodiments, content data 120 may be received in the form of audio wherein the audio may be converted to textual data. "Audio input device" for the purposes of this disclosure is a device that is configured to receive audio data. In one or more embodiments, audio input device may include a microphone. As used in this disclosure, a "microphone" is any transducer configured to transduce pressure change phenomenon to a signal, for instance a signal representative of a parameter associated with the phenomenon. Microphone, according to some embodiments, may include a transducer configured to convert sound into electrical signal. Exemplary non-limiting microphones include dynamic microphones (which may include a coil of wire suspended in a magnetic field), condenser microphones (which may include a vibrating diaphragm condensing plate), and a contact (or conductance) microphone (which may include piezoelectric crystal material). Microphone may include any microphone for transducing pressure changes, as described above; therefore, microphone may include any variety of microphone, including any of: condenser microphones, electret microphones, dynamic microphones, ribbon microphones, carbon microphones, piezoelectric microphones, fiber-optic microphones, laser microphones, liquid microphones, microelectromechanical systems (MEMS) microphones, and/or a speaker microphone. In one or more embodiments, a user may speak into microphone wherein processor 108 may receive audio data from microphone. In one or more embodiments, content data 120 may include audio data from microphone. In one or more embodiments, user may input previously recorded audio data wherein the previously recorded audio data includes audio data recorded on a previous date or time. In one or more embodiments, user may submit audio data such as podcasts, recorded conversations and the like, wherein processor 108 may receive audio data to be used for content data 120. In one or more embodiments, microphone may be configured to receive one or more audio signals. An "audio signal," as used in this disclosure, is a representation of sound. In some cases, an audio signal may include an analog electrical signal of time-varying electrical potential. In some embodiments, an audio signal may be communicated (e.g., transmitted and/or received) by way of an electrically transmissive path (e.g., conductive wire), for instance an audio signal path. Alternatively or additionally, audio signal may include a digital signal of time-varying digital numbers. In some cases, a digital audio signal may be communicated (e.g., transmitted and/or received) by way of any of an optical fiber, at least an electrically transmissive path, and the like. In some cases, a line code and/or a communication protocol may be used to aid in communication of a digital audio signal. Exemplary digital audio transports include, without limitation, Alesis Digital Audio Tape (ADAT), Tascam Digital Interface (TDIF), Toshiba Link (TOSLINK), Sony/Philips Digital Interface (S/PDIF), Audio Engineering Society standard 3 (AES3), Multichannel Audio Digital Interface (MADI), Musical Instrument Digital Interface (MIDI), audio over Ethernet, and audio over IP. Audio signals may represent frequencies within an audible range corresponding to ordinary limits of human hearing, for example substantially between about 20 and about 20,000 Hz. According to some embodiments, an audio signal may include one or more parameters, such as without limitation bandwidth, nominal level, power level (e.g., in decibels), and potential level (e.g., in volts). In some cases, relationship between power and potential for an audio signal may be related to an impedance of a signal path of the audio signal. In some cases, a signal path may single-ended or balanced. In one or more embodiments, microphone may be configured to transduce an environmental noise to an environmental noise signal. In some cases, environmental noise may include any of background noise, ambient noise, aural noise, such as noise heard by a user's ear, and the like. Additionally or alternatively, in some embodiments, environmental noise may include any noise present in an environment, such as without limitation an environment surrounding, proximal to, or of interest/disinterest to a user. Environmental noise may, in some cases, include substantially continuous noises, such as a drone of an engine. Alternatively or additionally, in some cases, environmental noise may include substantially non-continuous noises, such as spoken communication or a backfire of an engine. Environmental noise signal may include any type of signal, for instance types of signals described in this disclosure. For instance, an environmental noise signal may include a digital signal or an analog signal.

With continued reference to FIG. 1, content data 120 may be processed using a content module. "Content module" for the purposes of this disclosure is a system that is configured to modify, transform, or append data in order to make the data suitable for processing. For example, content module may perform optical character recognition on one or more digital files and extract textual data 124 from the one or more digital files. In another non limiting example, content module may classify element of content data 120, wherein classification may allow for identification of elements within content data 120.

With continued reference to FIG. 1, content module may convert elements of content data 120 using an optical character reader. In one or more embodiments, content data 120 may include data from files or documents that have been converted in machine-encoded test using an optical character reader (OCR). For example, a user may input digital records and/or scanned physical documents that have been converted to digital documents, wherein content data 120 may include data that has been converted into machine readable text. In some embodiments, optical character recognition or optical character reader (OCR) includes automatic conversion of images of written (e.g., typed, handwritten, or printed text) into machine-encoded text. In some cases, recognition of at least a keyword from an image component may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine learning processes. In some cases, intelligent word recognition (IWR) may recognize written text, one word at a time, for instance by employing machine learning processes.

Still referring to FIG. 1, in some cases, OCR may be an "offline" process, which analyses a static document or image frame. In some cases, handwriting movement analysis can be used as input for handwriting recognition. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of image components. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to the image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from the background of the image component. In some cases, binarization may be required for example if an employed OCR algorithm only works on binary images. In some cases, a line removal process may include the removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify a script allowing an appropriate OCR algorithm to be selected. In some cases, a character isolation or "segmentation" process may separate signal characters, for example, character-based OCR algorithms. In some cases, a normalization process may normalize the aspect ratio and/or scale of the image component.

Still referring to FIG. 1, in some embodiments, an OCR process will include an OCR algorithm. Exemplary OCR algorithms include matrix-matching process and/or feature extraction processes. Matrix matching may involve comparing an image to a stored glyph on a pixel-by-pixel basis. In some cases, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at the same scale as input glyph. Matrix matching may work best with typewritten text.

Still referring to FIG. 1, in some embodiments, an OCR process may include a feature extraction process. In some cases, feature extraction may decompose a glyph into features. Exemplary non-limiting features may include corners, edges, lines, closed loops, line direction, line intersections, and the like. In some cases, feature extraction may reduce dimensionality of representation and may make the recognition process computationally more efficient. In some cases, extracted feature can be compared with an abstract vector-like representation of a character, which might reduce to one or more glyph prototypes. General techniques of feature detection in computer vision are applicable to this type of OCR. In some embodiments, machine-learning process like nearest neighbor classifiers (e.g., k-nearest neighbors algorithm) can be used to compare image features with stored glyph features and choose a nearest match. OCR may employ any machine-learning process described in this disclosure, for example machine-learning processes described with reference to FIGS. 4-6. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

Still referring to FIG. 1, in some cases, OCR may employ a two-pass approach to character recognition. The second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool include OCRopus. OCRopus development is led by German Research Centre for Artificial Intelligence in Kaiserslautern, Germany. In some cases, OCR software may employ neural networks, for example neural networks as taught in reference to FIGS. 4, 5, and 6.

Still referring to FIG. 1, in some cases, OCR may include post-processing. For example, OCR accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make use of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

In one or more embodiments, content module may include an image classifier 132, wherein content module may be configured to classify images within content data 120. Content modules may use an image classifier 132 to classify images within any data described in this disclosure. An "image classifier," as used in this disclosure is a machine-learning model, such as a mathematical model, neural net, or program generated by a machine-learning algorithm known as a "classification algorithm," as described in further detail below, that sorts inputs of image information into categories or bins of data, outputting the categories or bins of data and/or labels associated therewith. Image classifier 132 may be configured to output at least a datum that labels or otherwise identifies a set of images that are clustered together, found to be close under a distance metric as described below, or the like. Computing device 104 and/or another device may generate image classifier 132 using a classification algorithm, defined as a process whereby computing device 104 104 derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. In some cases, processor 108 may use an image classifier 132 to identify a key image in data described in any data described in this disclosure. As used herein, a "key image" is an element of visual data used to identify and/or match elements to each other. An image classifier 132 may be trained with binarized visual data that has already been classified to determine key images in any other data described in this disclosure. "Binarized visual data" for the purposes of this disclosure is visual data that is described in binary format. For example, binarized visual data of a photo may be comprised of ones and zeroes wherein the specific sequence of ones and zeros may be used to represent the photo. Binarized visual data may be used for image recognition wherein a specific sequence of ones and zeroes may indicate a product present in the image. An image classifier 132 may be consistent with any classifier as discussed herein. An image classifier 132 may receive input data (e.g. content data 120) described in this disclosure and output a key image with the data. In some cases, image classifier 132 may identify one or more components within an image. In one or more embodiments, the image may depict a scene or a portion of a literary work. In some cases, image classifier 132 may identify a facial feature, a body of an individual and any other elements within an image. In one or more embodiments, image classifier 132 may identify objects within an image, such as but not limited to, a pen, a farm, a tree, a person, a car, and the like.

Continuing to reference FIG. 1, processor 108 and/or content module may use a machine learning module, such as any machine learning module herein, to implement one or more algorithms or generate one or more machine-learning models, and calculate data as described herein. However, the machine learning module is exemplary and may not be necessary to generate one or more machine learning models and perform any machine learning described herein. In one or more embodiments, one or more machine-learning models may be generated using training data. Training data may include inputs and corresponding predetermined outputs so that a machine-learning model may use correlations between the provided exemplary inputs and outputs to develop an algorithm and/or relationship that then allows machine-learning model to determine its own outputs for inputs. Training data may contain correlations that a machine-learning process may use to model relationships between two or more categories of data elements. Exemplary inputs and outputs may come from database 116, such as any database 116 described in this disclosure, or be provided by a user. In other embodiments, a machine-learning module may obtain a training set by querying a communicatively connected database 116 that includes past inputs and outputs. Training data may include inputs from various types of databases 116, resources, and/or user inputs and outputs correlated to each of those inputs so that a machine-learning model may determine an output. Correlations may indicate causative and/or predictive links between data, which may be modeled as relationships, such as mathematical relationships, by machine-learning models, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements. Machine learning module may be used to generate a machine learning model and/or any other machine learning model using training data. Machine learning model may be trained by correlated inputs and outputs of training data. Training data may be data sets that have already been converted from raw data whether manually, by machine, or any other method. Training data may be stored in database 116. Training data may also be retrieved from database 116.

With continued reference to FIG. 1, processor 108 and/or content module may classify data described in this disclosure using a classifier. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. Classifiers as described throughout this disclosure may be configured to output at least a datum that labels or otherwise identifies a set of data that are clustered together, found to be close under a distance metric as described below, or the like.

With continued reference to FIG. 1, processor 108 may be configured to generate classifiers as described throughout this disclosure using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database 116 116, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process for the purposes of this disclosure. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors for the purposes of this disclosure may be scaled, such that each vector represents each attribute along an equivalent scale of values. Each vector may be "normalized," or divided by a "length" attribute, such as a length attribute/as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With continued reference to FIG. 1, content module may receive content data 120 at processor 108. In some embodiments, content module and/or image classifier 132 may have formatting requirements to ensure efficient processing and output of data from processor 108. Keeping that in mind, apparatus may utilize content module to perform pre-processing on content data 120. It should be noted that content modules may perform pre-processing for any data input to apparatus 100. Methods of pre-processing may include interpolation processes as discussed in more detail below.

Still referring to FIG. 1, content module may use interpolation and/or up sampling methods to process content data 120. For instance, where content data 120 may include image data 136, processor 108 may convert a low pixel count image into a desired number of pixels need to for input into an image classifier 132; as a non-limiting example, an image classifier 132 may have a number of inputs into which pixels are input, and thus may require either increasing or decreasing the number of pixels in an image to be input and/or used for training image classifier 132, where interpolation may be used to increase to a required number of pixels. As a non-limiting example, a low pixel count image may have 100 pixels, however a number of pixels needed for an image classifier 132 may be 128. Content module may interpolate the low pixel count image to convert the 100 pixels into 128 pixels so that a resultant image may be input into an image classifier 132. It should be noted that image classifier 132 may be any classifier as described in this disclosure. It should also be noted that one of ordinary skill in the art, upon reading this disclosure, would know the various methods to interpolate a low pixel count image to a desired number of pixels required by an image classifier 132. In some instances, a set of interpolation rules may be trained by sets of highly detailed images and images that may have been down sampled to smaller numbers of pixels, for instance and without limitation as described below, and a neural network or other machine learning model that is trained using the training sets of highly detailed images to predict interpolated pixel values in a facial picture context. As a non-limiting example, a sample picture with sample-expanded pixels (e.g., pixels added between the original pixels) may be input to a neural network or machine-learning model and output a pseudo replica sample-picture with dummy values assigned to pixels between the original pixels based on a set of interpolation rules. In some instances, image classifier 132 and/or another machine-learning model may have a set of interpolation rules trained by sets of highly detailed images and images that have been down sampled to smaller numbers of pixels, and a neural network or other machine learning model that is trained using those examples to predict interpolated pixel values in a facial picture context. I.e., you run the picture with sample-expanded pixels (the ones added between the original pixels, with dummy values) through this neural network or model and it fills in values to replace the dummy values based on the rules.

Still referring to FIG. 1, content module may utilize sample expander methods, a low-pass filter, or both. As used in this disclosure, a "low-pass filter" is a low-pass filter is a filter that passes signals with a frequency lower than a selected cutoff frequency and attenuates signals with frequencies higher than the cutoff frequency. The exact frequency response of the filter depends on the filter design. In some embodiments, content module may use luma or chroma averaging to fill in pixels in between original image pixels. Content module may down-sample image data 136 to a lower number of pixels to input into an image classifier 132. As a non-limiting example, a high pixel count image may have 356 pixels, however a number of pixels needed for an image classifier 132 may be 128. Content module may down-sample the high pixel count image to convert the 356 pixels into 128 pixels so that a resultant image may be input into an image classifier 132.

In some embodiments, and with further reference to FIG. 1, processor 108 and/or content module may be configured to perform down sampling on data such as without limitation image data 136. "Image data" for the purposes of this disclosure is information associated with an image. Image data 136 may include a digital image, metainformation and the like. For instance, and without limitation, where an image to be input to image classifier 132, and/or to be used in training examples, has more pixel than a number of inputs to such classifier. Down sampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean upside-effects of compression.

Continuing to refer to FIG. 1, any training data described in this disclosure may include two or more sets of image quality-linked training data. "Image quality-linked" training data, as described in this disclosure, is training data in which each training data element has a degree of image quality, according to any measure of image quality, matching a degree of image quality of each other training data element, where matching may include exact matching, falling within a given range of an element which may be predefined, or the like. For example, a first set of image quality-linked training data may include images having no or extremely low blurriness, while a second set of image quality-linked training data. In an embodiment, sets of image quality-linked training data may be used to train image quality-linked machine-learning processes, models, and/or classifiers as described in further detail below. In one or more embodiments, training data may include a plurality of low resolution paired to high resolution images and/or a plurality of low-resolution images paired to a plurality of high-resolution images. In one or more embodiments, training data may be used to train a machine learning model, wherein the machine learning model may be used to determine a relationship between inputs of training data and corresponding outputs of training data. In one or more embodiments, content module may perform one or more data augmentation processes in order to increase the number of inputs and correlated outputs within training data. "Data augmentation" for the purposes of this disclosure is a process in which already existing images are modified in order to increase the number of inputs and correlated outputs within training data. In one or embodiments, data augmentation may improve the performance of one or more machine learning models by increasing the variability of inputs and outputs. In one or more embodiments, data augmentation may improve the performance of one or more machine learning models wherein new samples are generated in order to train existing machine learning models. In one or more embodiments, data augmentation may allow for increased accuracy in image classification, interpolation and the like. In one or more embodiments, data augmentation may include modifications made to an input image and a corresponding output image. In one or more embodiments, content module may modify data by rotating images, flipping images, cropping images, changing the brightness of images, changing the contrast of images, changes the color within an image, changing the saturation within an image, changing the scaling of an image, adding and/or removing noise from an image and the like. In one or more embodiments, data augmentation may allow a machine learning model to determine new relationships between two correlated images wherein the machine learning model may be trained with a plurality of variations of the same or similar images. In one or more embodiments, data augmentation may train the machine learning model to adapt to various situations, such as images in low lighting, images that have been downscaled and the like.

Referring still to FIG. 1, training data, images, and/or other elements of data suitable for inclusion in training data may be stored, without limitation, in an image database. Image database may include any data structure for ordered storage and retrieval of data, which may be implemented as a hardware or software module. Image database may be implemented, without limitation, as a relational database 116, a key-value retrieval datastore such as a NOSQL database 116, or any other format or structure for use as a datastore that a person skilled in the art would recognize as suitable upon review of the entirety of this disclosure. An image database may include a plurality of data entries and/or records corresponding to entity tests as described above. Data entries in an image database may be flagged with or linked to one or more additional elements of information, which may be reflected in data entry cells and/or in linked tables such as tables related by one or more indices in a relational database 116. Persons skilled in the art, upon reviewing the entirety of this disclosure, will be aware of various ways in which data entries in an image database may reflect categories, cohorts, and/or populations of data consistently with this disclosure. Image database may be located in memory 112 of apparatus and/or on another device in and/or in communication apparatus.

With continued reference to FIG. 1, content module may interpolate images within content data 120 to a desired pixel count wherein the image may be fed into image classifier 132. In one or more embodiments, image classifier 132 may identify one or more objects within image data 136 and generate textual data 124 as a function of image classifier 132. In one or more embodiments, content data 120 may include image data 136. In one or more embodiments, content module may interpolate image data 136 to a desired pixel count required by image classifier 132 as a function of a machine learning model as described above. In one or more embodiments, content module may generate textual data 124 as a function of the interpolation and the image classifier 132.

With continued reference to FIG. 1, content module may classify content data 120 to one or more content sections 140. "Content section," for the purposes of this disclosure, is a grouping of elements within content data 120 that share a common characteristic. In one or more embodiments, content section 140 may include a scene of a literary work wherein each content section 140 may be associated with a scene within content data 120. In one or more embodiments, content section 140 may include a paragraph, a chapter, a plot element (e.g. exposition, rising action, climax, falling action, resolution), a structural component of a written work (e.g. abstract, background, introduction, conclusion and the like) and the like. In one or more embodiments, content sections 140 may be used to separate portions of content data 120 wherein each portion may be processed separately. In one or more embodiments, content section 140 may allow for categorization of one or more data elements within content data 120. In one or more embodiments, content module may use a content classifier wherein the content classifier may be configured to classify data elements within content data 120 to one or more content sections 140. In one or more embodiments, textual data 124 generated from OCR, image classification and the like as described above may be classified to one or more content sections 140. In one or more embodiments, classifiers as described throughout this disclosure may be configured to output at least a datum that labels or otherwise identifies a set of data that are clustered together, found to be close under a distance metric as described below, or the like. In some cases, processor 108 and/or content module may generate and train a content classifier configured to receive content data 120 and output one or more content sections 140. Processor 108 and/or another device may generate a classifier using a classification algorithm, defined as a process whereby a computing device 104 derives a classifier from training data. In some cases content classifier may use data to prioritize the order of labels within content data 120. Classification may be performed using, without limitation, linear classifiers such as without limitation logistic regression and/or naive Bayes classifiers, nearest neighbor classifiers such as k-nearest neighbors' classifiers, support vector machines, least squares support vector machines, fisher's linear discriminant, quadratic classifiers, decision trees, boosted trees, random forest classifiers, learning vector quantization, and/or neural network-based classifiers. A content classifier may be trained with training data correlating content data 120 to content one or more content sections 140. Training data may include a plurality of content data 120 correlated to a plurality of content sections 140. In an embodiment, training data may be used to show that a particular element or elements within content data 120 may be correlated to a particular content section 140. Training data may be received from an external computing device 104, input by a user, and/or previous iterations of processing. A content classifier may be configured to receive as input and categorize components of content data 120 to one or more content categorizations. In some cases, processor 108 and/or computing device 104 may then select any elements within content data 120 containing a similar label and/or grouping and group them together. In some cases, content data 120 may be classified using a content classifier machine learning model. In some cases content classifier machine learning model may be trained using training data correlating a plurality of content data 120 correlated to a plurality of content sections 140. In an embodiment, a particular element within content data 120 may be correlated to a particular content section 140. In some cases, classifying content data 120 may include classifying content data 120 as a function of the classifier machine learning model. In some cases content classifier training data may be generated through input by a user. In some cases, content classifier machine learning model may be trained through user feedback 184 wherein a user may indicate whether a particular element corresponds to a particular class. In some cases, content classifier machine learning model may be trained using inputs and outputs based on previous iterations. In some cases, a user may input previous content data 120 and corresponding content sections 140 wherein classifier machine learning model may be trained based on the input.

With continued reference to FIG. 1, in some embodiments, classifier training data may be iteratively updated using feedback. Feedback, in some embodiments, may include user feedback 184. For example, user feedback 184 may include a rating, such as a rating from 1-10, 1-100, −1 to 1, "happy," "sad," and the like. In some embodiments, user feedback 184 may rate a user's satisfaction with the classification of one or more elements to a content section 140.

With continued reference to FIG. 1, in one or more embodiments, content data 120 may already be classified to content sections 140 prior to receipt by processor 108. In one or more embodiments, computing device 104 may receive content data 120 wherein elements within content data 120 have already been categorized. In one or more embodiments, a user may label and/or sort content data 120 to one or more content sections 140 prior to receipt of content data 120 by computing device 104.

With continued reference to FIG. 1, in one or more embodiments where content data include audio data, content module may process audio data and convert audio data into textual data. In one or more embodiments, audio data may include audio signals. In one or more embodiments, content module may include one or more speech to text system wherein the system is configured to receive speech in the form of audio signals and/or audio data and convert the speech into textual data. In one or more embodiments, content module may include automatic speech recognition. "Automatic speech recognition" for the purposes of this disclosure is a system configured to convert speech into text. In some embodiments, automatic speech recognition may require training (i.e., enrollment). In some cases, training an automatic speech recognition model may require an individual speaker to read text or isolated vocabulary. In some cases, a solicitation video may include an audio component having an audible verbal content, the contents of which are known a priori by computing device 104. Computing device 104 may then train an automatic speech recognition model according to training data which includes audible verbal content correlated to known content. In this way, computing device 104 may analyze a person's specific voice and train an automatic speech recognition model to the person's speech, resulting in increased accuracy. Alternatively or additionally, in some cases, computing device 104 may include an automatic speech recognition model that is speaker-independent. As used in this disclosure, a "speaker independent" automatic speech recognition process does not require training for each individual speaker. Conversely, as used in this disclosure, automatic speech recognition processes that employ individual speaker specific training are "speaker dependent."

Still referring to FIG. 1, in some embodiments, an automatic speech recognition process may perform voice recognition or speaker identification. As used in this disclosure, "voice recognition" refers to identifying a speaker, from audio content, rather than what the speaker is saying. In some cases, computing device 104 may first recognize a speaker of verbal audio content and then automatically recognize speech of the speaker, for example by way of a speaker dependent automatic speech recognition model or process. In some embodiments, an automatic speech recognition process can be used to authenticate or verify an identity of a speaker. In some cases, a speaker may or may not include subject. For example, subject may speak within solicitation video, but others may speak as well.

Still referring to FIG. 1, in some embodiments, an automatic speech recognition process may include one or all of acoustic modeling, language modeling, and statistically-based speech recognition algorithms. In some cases, an automatic speech recognition process may employ hidden Markov models (HMMs). As discussed in greater detail below, language modeling such as that employed in natural language processing applications like document classification or statistical machine translation, may also be employed by an automatic speech recognition process.

Still referring to FIG. 1, an exemplary algorithm employed in automatic speech recognition may include or even be based upon hidden Markov models. Hidden Markov models (HMIs) may include statistical models that output a sequence of symbols or quantities. HMIs can be used in speech recognition because a speech signal can be viewed as a piecewise stationary signal or a short-time stationary signal. For example, over a short time scale (e.g., 10 milliseconds), speech can be approximated as a stationary process. Speech (i.e., audible verbal content) can be understood as a Markov model for many stochastic purposes.

Still referring to FIG. 1, in some embodiments HMIs can be trained automatically and may be relatively simple and computationally feasible to use. In an exemplary automatic speech recognition process, a hidden Markov model may output a sequence of n-dimensional real-valued vectors (with n being a small integer, such as 10), at a rate of about one vector every 10 milliseconds. Vectors may consist of cepstral coefficients. A cepstral coefficient requires using a spectral domain. Cepstral coefficients may be obtained by taking a Fourier transform of a short time window of speech yielding a spectrum, decorrelating the spectrum using a cosine transform, and taking first (i.e., most significant) coefficients. In some cases, an HMM may have in each state a statistical distribution that is a mixture of diagonal covariance Gaussians, yielding a likelihood for each observed vector. In some cases, each word, or phoneme, may have a different output distribution; an HMM for a sequence of words or phonemes may be made by concatenating an HMMs for separate words and phonemes.

Still referring to FIG. 1, in some embodiments, an automatic speech recognition process may use various combinations of a number of techniques in order to improve results. In some cases, a large-vocabulary automatic speech recognition process may include context dependency for phonemes. For example, in some cases, phonemes with different left and right context may have different realizations as HMM states. In some cases, an automatic speech recognition process may use cepstral normalization to normalize for different speakers and recording conditions. In some cases, an automatic speech recognition process may use vocal tract length normalization (VTLN) for male-female normalization and maximum likelihood linear regression (MLLR) for more general speaker adaptation. In some cases, an automatic speech recognition process may determine so-called delta and delta-delta coefficients to capture speech dynamics and might use heteroscedastic linear discriminant analysis (HLDA). In some cases, an automatic speech recognition process may use splicing and an linear discriminate analysis (LDA)-based projection, which may include heteroscedastic linear discriminant analysis or a global semi-tied covariance transform (also known as maximum likelihood linear transform [MLLT]). In some cases, an automatic speech recognition process may use discriminative training techniques, which may dispense with a purely statistical approach to HMM parameter estimation and instead optimize some classification-related measure of training data; examples may include maximum mutual information (MMI), minimum classification error (MCE), and minimum phone error (MPE).

Still referring to FIG. 1, in some embodiments, an automatic speech recognition process may be said to decode speech (i.e., audible verbal content). Decoding of speech may occur when an automatic speech recognition system is presented with a new utterance and must compute a most likely sentence. In some cases, speech decoding may include a Viterbi algorithm. A Viterbi algorithm may include a dynamic programming algorithm for obtaining a maximum a posteriori probability estimate of a most likely sequence of hidden states (i.e., Viterbi path) that results in a sequence of observed events. Viterbi algorithms may be employed in context of Markov information sources and hidden Markov models. A Viterbi algorithm may be used to find a best path, for example using a dynamically created combination hidden Markov model, having both acoustic and language model information, using a statically created combination hidden Markov model (e.g., finite state transducer [FST] approach).

Still referring to FIG. 1, in some embodiments, speech (i.e., audible verbal content) decoding may include considering a set of good candidates and not only a best candidate, when presented with a new utterance. In some cases, a better scoring function (i.e., re-scoring) may be used to rate each of a set of good candidates, allowing selection of a best candidate according to this refined score. In some cases, a set of candidates can be kept either as a list (i.e., N-best list approach) or as a subset of models (i.e., a lattice). In some cases, re-scoring may be performed by optimizing Bayes risk (or an approximation thereof). In some cases, re-scoring may include optimizing for sentence (including keywords) that minimizes an expectancy of a given loss function with regards to all possible transcriptions. For example, re-scoring may allow selection of a sentence that minimizes an average distance to other possible sentences weighted by their estimated probability. In some cases, an employed loss function may include Levenshtein distance, although different distance calculations may be performed, for instance for specific tasks. In some cases, a set of candidates may be pruned to maintain tractability.

Still referring to FIG. 1, in some embodiments, an automatic speech recognition process may employ dynamic time warping (DTW)-based approaches. Dynamic time warping may include algorithms for measuring similarity between two sequences, which may vary in time or speed. For instance, similarities in walking patterns would be detected, even if in one video the person was walking slowly and if in another he or she were walking more quickly, or even if there were accelerations and deceleration during the course of one observation. DTW has been applied to video, audio, and graphics—indeed, any data that can be turned into a linear representation can be analyzed with DTW. In some cases, DTW may be used by an automatic speech recognition process to cope with different speaking (i.e., audible verbal content) speeds. In some cases, DTW may allow computing device 104 to find an optimal match between two given sequences (e.g., time series) with certain restrictions. That is, in some cases, sequences can be "warped" non-linearly to match each other. In some cases, a DTW-based sequence alignment method may be used in context of hidden Markov models.

Still referring to FIG. 1, in some embodiments, an automatic speech recognition process may include a neural network. Neural network may include any neural network, for example those disclosed with reference to FIGS. 5-6. In some cases, neural networks may be used for automatic speech recognition, including phoneme classification, phoneme classification through multi-objective evolutionary algorithms, isolated word recognition, audiovisual speech recognition, audiovisual speaker recognition and speaker adaptation. In some cases. neural networks employed in automatic speech recognition may make fewer explicit assumptions about feature statistical properties than HMMs and therefore may have several qualities making them attractive recognition models for speech recognition. When used to estimate the probabilities of a speech feature segment, neural networks may allow discriminative training in a natural and efficient manner. In some cases, neural networks may be used to effectively classify audible verbal content over short-time interval, for instance such as individual phonemes and isolated words. In some embodiments, a neural network may be employed by automatic speech recognition processes for pre-processing, feature transformation and/or dimensionality reduction, for example prior to HMM-based recognition. In some embodiments, long short-term memory (LSTM) and related recurrent neural networks (RNNs) and Time Delay Neural Networks (TDNN's) may be used for automatic speech recognition, for example over longer time intervals for continuous speech recognition.

With continued reference to FIG. 1, processor 108 is configured to receive preference data 144 from user. "Preference data" for the purposes of this disclosure is a preferred literary style in which a literary work may be created. For example, preference data 144 may include a tone wherein the tone is an expression of the author's attitude. In one or more embodiments, preference style may include tones, such as but not limited to, amusement, anger, affection, sorrow and/or contempt. In one or more embodiments, preference data 144 may include writing style preferences, such as but not limited to, persuasive, narrative, expository, descriptive, first person, third person, language complexity (e.g. language may be simple and understandable for a child or difficult for adults), mood, syntax, chapter lengths, book length and the like. In one or more embodiments, preference data 144 may include an intended audience wherein the intended audience may include particular demographics, particular age groups, particular ethnicities, particular genders and the like. In one or more embodiments, preference data 144 may include preferences for the layout of the literary work, such as but not limited to, book length, chapter lengths, reading level (e.g. reading level suitable for a 6-year-old, reading level suitable for a teenager and the like), content section 140 length and the like.

With continued reference to FIG. 1, processor 108 may receive one or more elements of preference data 144 from within content data 120. In one or more embodiments, content data 120 may include textual data 124 of one or more writing styles that the user would like to incorporate in one or more embodiments, processor 108 may be configured to receive those writing styles from content data 120 and include them in preference data 144. In one or more embodiments, processor 108 may use a preference classifier to classify elements of content data 120 to one or more writing style preferences within preference data 144. In one or more embodiments, preference classifier may identify element within content data and classify them to one or more writing style preference categorization. For example, an element within content data 120 such as "I" may indicate that the content data or a portion thereof is written in first person. In one or more embodiments, preference classifier may include a machine learning model trained with preference training data. In or more embodiments, preference training data may include a plurality of content data correlated to a plurality of preference data 144 and/or writing style preferences. In an embodiment, elements within content data may be associated with a writing style categorization wherein processor 108 may determine preference data based on the classification. In one or more embodiments, the presence of an element within content data 120 classified to a writing style preference may indicate preference data. For example, an element within content data such as "I" may be classified to a first-person writing style wherein the classification may be used as preference data 144. In one or more embodiments, any writing styles that have been classified to elements within content data may be input into preference data. For example, preference data 144 may include information such as "autobiography" in instances where elements of content data have been classified to an autobiography writing style preference. In one or more embodiments, preference data may include a single grouping from each writing style preference. For example, preference data 144 may only include a scared tone for a tone grouping wherein the one grouping may include happy, sad, scared and the like. In one or more embodiments, processor 108 may select the grouping that is most abundant within Content data 120. For example, preference data 144 may include "sad" as the preferred tone when a majority of elements within content data is classified to a sad tone grouping in comparison to other tones.

With continued reference to FIG. 1, preference data 144 and/or elements thereof may be received by a chatbot system 148. A "chatbot system" for the purposes of this disclosure is a program configured to simulate human interaction with a user with a user in order to receive or convey information. In some cases, chatbot system 148 may be configured to receive preference data 144 and/or elements thereof through interactive questions presented to the user. the questions may include, but are not limited to, questions such as "What tone would you like to convey?", "Who is your intended audience?", "How long would you like your literary work to be?" and the like. In some cases, computing device 104 may be configured to present a comment box through a user interface wherein a user may interact with the chatbot and answer the questions through input into the chat box. In some cases, questions may require selection of one or more pre-configured answers. For example, chatbot system 148 may ask a user to select a particular tone, wherein the user may select a tone from a list of pre-configured answers. In situations where answers are limited to limited responses, chatbot may be configured to display checkboxes wherein a user may select a box that is most associated with their answer. In some cases, chatbot may be configured to receive preference data 144 through an input. In some cases, each question may be assigned to a particular categorization wherein a response to the question may be assigned to the same categorization. For example, a question prompting a user to input a tone may be assigned to a tone categorization, whereas a response from the user associated with literary work length may be assigned to a length categorization. In one or more embodiments, chatbot system 148 may be configured to simulate human interaction, wherein chatbot system 148 may simulate human interaction with user and extract preference data 144 through the interaction. In one or more embodiments, processor 108 may be configured to display a plurality of pre-generated questions to a user, wherein responses to the questions may be received as preference data. In one or more embodiments, processor 108 may retrieve the pre-generated questions from database 116. In one or more embodiments, processor may be configured to present the pre-generated questions to a user and use the responses as preference data. In one or more embodiments, a user may input a response to only a few questions wherein the few responses received may be received as preference data.

With continued reference to FIG. 1, processor 108 is configured to create and/or generate a plurality of templates 152 as a function of the preference data 144 and the content data 120. "Template," for the purposes of this disclosure, refers to a computer-generated literary work. In one or more embodiments, template 152 may include portion of a literary work, such as a single paragraph, a single page, a chapter, a scene, and the like. In one or more embodiments, template 152 may include textual data 124 wherein the textual data 124 includes a coherent portion of a literary work based on content data 120. In one or more embodiments, the textual data 124 may include a portion of a story, a portion, or a literary work, a paragraph, a page, and the like. In one or more embodiments, each template 152 may be associated with one or more content sections 140, wherein each template 152 may be associated with data elements classified to each content section 140. In one or more embodiments, one or more templates 152 may be associated with one or more content sections 140. In one or more embodiments, processor 108 may classify content data 120 to one or more content sections 140, wherein processor 108 may generate one or more templates 152 for each content section 140. In one or more embodiments, creating the plurality of templates 152 as a function of the preference data 144 and the plurality of content data 120 includes creating one or more templates 152 for each content section 140 of the one or more content sections 140. In one or more embodiments, content data 120 may include bullet points and/or any other information wherein template 152 may include a written literary work that has incorporated the bullet points and/or any other information. In one or more embodiments, each template 152 may include content incorporated from content data 120. In one or more embodiments, processor 108 is configured to generate a plurality of templates 152 wherein the plurality of templates 152 contain information incorporated from content data 120. In one or more embodiments, template 152 may include generated written and coherent sentences contained within a paragraph, a page, a chapter, a scene and the like. In one or more embodiments, template 152 may include but is not limited to, a cover page, an author biography (based on user profile), selected fonts, selected font sizing, particular margins, particular spacing, particular chapter headings and the like.

With continued reference to FIG. 1, processor 108 may feed and/or input content data 120, preference data 144 and/or the classification of content data 120 into a template module 156, wherein the template module 156 may output a plurality of templates 152 associated with content data 120, preference data 144 and/or any other inputs as described in this disclosure. "Template module" for the purposes of this disclosure is a system that is configured to generate one or more templates 152 based on received input data. Input data may include but is not limited to, content data 120, preference data 144, the classification of content data 120 and/or any data output and/or processed by content module.

In one or more embodiments, content module may be configured to generate one or more templates 152 as a function of a machine learning model. Processor 108 and/or template module 156 may use a machine learning module, such as a template machine learning module for the purposes of this disclosure, to implement one or more algorithms or generate one or more machine-learning models, such as a template machine learning model 160, to create one or more templates 152. However, the machine learning module is exemplary and may not be necessary to generate one or more machine learning models and perform any machine learning described herein. In one or more embodiments, one or more machine-learning models may be generated using training data. Training data may include inputs and corresponding predetermined outputs so that a machine-learning model may use correlations between the provided exemplary inputs and outputs to develop an algorithm and/or relationship that then allows machine-learning model to determine its own outputs for inputs. Training data may contain correlations that a machine-learning process may use to model relationships between two or more categories of data elements. Exemplary inputs and outputs may come from database 116, such as any database 116 described in this disclosure, or be provided by a user. In other embodiments, a machine-learning module may obtain a training set by querying a communicatively connected database 116 that includes past inputs and outputs. Training data may include inputs from various types of databases 116, resources, and/or user inputs and outputs correlated to each of those inputs so that a machine-learning model may determine an output. Correlations may indicate causative and/or predictive links between data, which may be modeled as relationships, such as mathematical relationships, by machine-learning models, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to categories by tags, tokens, or other data elements. A machine learning module, such as template machine learning module, may be used to create template machine learning model 160 and/or any other machine learning model using training data. Template machine learning model 160 may be trained by correlated inputs and outputs of training data. Training data may be data sets that have already been converted from raw data whether manually, by machine, or any other method. Template training data 164 may be stored in database 116. Template training data 164 may also be retrieved from database 116. In some cases template machine learning model 160 may be trained iteratively using previous inputs correlated to previous outputs. For example, processor 108 may be configured to store content data 120 from current iteration and one or more templates 152 to train the machine learning model. In some cases, the machine learning model may be trained based on user input. For example, a user may indicate that one or more templates 152 are inaccurate wherein the machine learning model may be trained as a function of the user input. In some cases, the machine learning model may allow for improvements to computing device 104 such as but not limited to improvements relating to comparing data items, the ability to sort efficiently, an increase in accuracy of analytical methods and the like.

With continued reference to FIG. 1 creating one or more templates 152 may include receiving template training data 164 having a plurality of content data 120 correlated to a plurality of templates 152. In one or more embodiments, the plurality of content data 120 may include content data 120 of previous iterations correlated to templates 152 of previous iterations. In some cases, a user may input one or more sets of content data 120 correlated to one or more sets of templates 152 to begin the machine learning process, wherein processor 108 may be configured to retrieve content data 120 of future iterations and corresponding templates 152 to be used as training data to train machine learning model. In some embodiments, template training data 164 may be received from a user, third party, database 116, external computing devices 104, previous iterations of processing, and/or the like as described in this disclosure. In some cases, creating one or more templates 152 may include training template machine learning model 160 as a function of content data 120 and creating a plurality of templates 152 as a function of the template machine learning model 160.

With continued reference to FIG. 1, template machine learning model 160 may receive content data 120 and create one or more templates 152. In one or more embodiments, template 152 may receive positions of content data 120 classified to one or more content sections 140 wherein each portion may be used to generate template 152. In one or more embodiments, each grouping of data within content data 120 classified to content section 140 may be fed into template machine learning model 160 wherein template machine learning model 160 may be configured to generate one or more templates 152 for each content section 140. In one or more embodiments, template machine learning model 160 may include any machine learning model as described in this disclosure. In one or more embodiments, template training data 164 may include a plurality of content data 120 and preference data 144 correlated to a plurality of templates 152. In one or more embodiments, inputs such as content data 120 and preference data 144 may be correlated to outputs such as templates 152.

With continued reference to FIG. 1, each template 152 may include a plurality of sub templates. "Sub template" for the purposes of this disclosure is an independent portion of template 152. In one or more embodiments, content data 120 may include a plurality of elements wherein each element may be fed into template machine learning model 160 to generate one or more sub templates. For example, content data 120 may include a plurality of bullet points wherein each bullet point may be generated into sub template. In an embodiment, template training data 164 may include a plurality of data elements correlated to a plurality of sub templates. In one or more embodiments, sub template may include a paragraph, a sentence, a page and the like. In one or more embodiments, one or more sub templates may be aggregated to create template 152. In one or more embodiments, feeding smaller amounts of data into a machine learning model may allow for more a wider selection of data selected and outputs of the machine learning model. In one or more embodiments, a wide selection may allow for more accurate results.

With continued reference to FIG. 1, in one or more embodiments, template module 156 may be configured to generate a template structure. "Template structure" for the purposes of this disclosure is a list of data that is to be categorized from first to last. In one or more embodiments, template structure may include data elements of content data 120 that have been sorted and/or ranked from first to last. In one or more embodiments, template structure may include a plurality of sub templates and/or templates 152 that have been sorted and/or ranked from first to last. In one or more embodiments, each grouping of data elements associated with each content section 140 may be ranked from first to last. In one or more embodiments, template structure may provide for a timeline, a sequence of events and the like that may be used to generate literary work. In one or more embodiments, template structure may include inputs that have been sorted wherein a first input may be used in the beginning of a literary work and the last input may be used at the end of the literary work. In one or more embodiments, template module 156 may include a structured machine learning model wherein the structured machine learning model is configured to receive a plurality of inputs and sort the plurality of inputs. In one or more embodiments, structured machine learning model may receive inputs such as content data 120, elements of content data 120, content data 120 classified to one or more content sections 140, templates 152, sub templates and the like and output template structure containing a sorted list of the inputs. In one or more embodiments, structured machine learning model may include structured straining data having a plurality of inputs such as content data 120, elements of content data 120, content data 120 classified to one or more content sections 140, templates 152, sub templates and the like correlated to a plurality of outputs such as template structures. In one or more embodiments, template structure may be received by a user wherein a user may indicate that the order in which content data 120 has been received may be in a desired order already. In one or more embodiments, chatbot system 148 may be configured to receive a response from user indicating if a template structure should be created or if the data that has been provided within content data 120 is already sorted. In one or more embodiments, structured training data may be classified to one or more content sections 140 using content classifier wherein each contents section may depict a particular ranking within template structure. For example, content section 140 such as background may be placed first whereas a content section 140 such as conclusion may be placed last. In one or more embodiments, template structure may include a ranking for each template 152.

With continued reference to FIG. 1, in one or more embodiments, template module 156 may be configured to generate a transition 168 between one or more elements of content data 120, one or more sub templates, one or more templates 152 and the like. "Transition" for the purposes of this disclosure is textual data 124 that may be used to link and associate two unrelated data together. For example, one element of content data 120 may include information associated with cars, whereas another element of content may include information associated with tropical beaches. Continuing, transition 168 may include textual information that may be used to link the car to the beach. In one or more embodiments, transition 168 may be used to create an association between two templates 152, two sub templates, two elements of content data 120 and the like. In one or more embodiments, template module 156 may generate transition 168 between every input such as but not limited to, elements with content data 120, every grouping of content data 120 classified to content sections 140, every template 152, every sub template and the like. In one or more embodiments, template module 156 may be configured to generate a plurality of transition 168 between one or more inputs. In one or more embodiments, transition 168 may allow for a linking of each input to one another. In one or more embodiments, transition 168 may allow for inputs to be correlated to one another. In one or more embodiments, template module 156 may receive template structure and generate a transition 168 between each sorted input. For example, template module 156 may generate transition 168 between first template 152 and second template 152, transition 168 between second template 152 and third template 152, transition 168 between third template 152 and fourth template 152 and the like. In one or more embodiments, transition 168 may allow for generating of a single coherent literary work that has been generated by a plurality of templates 152, sub templates, content data 120 and the like.

In one or more embodiments, transition 168 may be generated as a function of a machine learning model such as any machine learning model as described herein. In one or more embodiments, transition 168 training data may include a plurality of inputs such as any inputs as described above correlated to a plurality of transitions 168. In an embodiment, an input may contain a correlated transition 168. In one or more embodiments, two or more inputs may include one or more transitions 168 that link the inputs together. In one or more embodiments, training data may include a plurality of elements of content data 120 correlated to a plurality of transitions 168. In one or more embodiments, transition 168 training data may be used to train a transition 168 machine learning model. In one or more embodiments, transition 168 may be generated as a function of transition 168 machine learning model. In one or more embodiments, one or more element of content data 120, one or more content sections 140 associated with content data 120 and the like may be used to generate transition 168 as a function of transition 168 machine learning model. In one or more embodiments, content data 120 and transition 168 may be fed into template machine learning model 160 wherein template 152 may be created.

In one or more embodiments, template module 156 may utilize an inference engine 172 to generate transition 168 between two or more data. "Inference engine" for the purposes of this disclosure is system which applies a set of logical rules to in order to deduce new knowledge. In one or more embodiments, inference engine 172 may be used to draw logical conclusions on a piece of literary work. In one or more embodiments, inference engine 172 may be used to generate logical relationships between two data. for example, inference engine 172 may be used to generate logical relationships between inputs such as templates 152, elements of content data 120, classified groupings of content data 120, sub templates and the like. In one or more embodiments, inference engine 172 may be used to generate transition 168 between two inputs. In one or more embodiments, inference engine 172 may be used to ensure that inconsistencies within a literary work do not arise. In one or more embodiments, inference engine 172 may be used to ensure that a literary work contains consistency throughout. In one or more embodiments, inference engine 172 may be used to generate transition 168 between templates 152, transition 168 between sub templates, transition 168 between elements of content data 120 and the like.

With continued reference to FIG. 1 inference engine 172 may include and/or be communicatively connected to a knowledge base. "Knowledge base" for the purposes of this disclosure is a collection of information that is used by inference engine 172 to generate logical inferences and conclusions. In one or more embodiments, knowledge base may include facts about a real or fictitious world. In one or more embodiments, the inference engine 172 may apply logical rules to the knowledge base in order to generate new knowledge. In one or more embodiments, knowledge base may be populated by content data 120. In one or more embodiments, a machine learning model may be configured to generate facts within content data 120. In one or more embodiments, the machine learning model may be configured to summarize or shorten textual data 124 within content data 120. In one or more embodiments, inference engine 172 may include a set of rules that may be used to generate logical relationships between one or more elements of content data 120. In one or more embodiments, logical relationships may be used to generate transition 168. In one or more embodiments, inference engine 172 may contain a plurality of logical rules that have been retrieved by database 116. In one or more embodiments, inference engine 172 may be used to generate logical inferences between characters, settings, places and the like within content data 120. In one or more embodiments, a machine learning model containing logical training data may be used to generating logical rules for the inference engine 172. In one or more embodiments, logical training data may include a plurality of literary works correlated to a plurality of logical rules. In one or more embodiments, content data 120 and/or template 152 may be fed into machine learning model to receive one or more logical rules to be used for interference engine. In one or more embodiments, processor 108 may receive a theme, a writing style and the like from content data 120 and/or preference data 144 and retrieve one or more logical rules associated with the theme, writing style and the like. In one or more embodiments, database 116 may be populated with a plurality of logical rules wherein each set of logical rules may be correlated to a setting, a writing style, a genre, a tone and the like. In one or more embodiments, some logical rules may be common to most if not all, content data 120 wherein processor 108 may be configured to retrieve certain logical rules regardless of categorization, preference data 144 and the like.

With continued reference to FIG. 1, template module 156 may receive content data 120 and/or classified elements of content data 120 and generate a template structure as a function of content data 120. In one or more embodiments, template module 156 may receive template structure and generate transitions 168 between elements of content data 120. In one or more embodiments, template module 156 may further generate templates 152 as a function of the content data 120, the transitions 168, the template structure and the like. In one or more embodiments, processes within template module 156 may be used out of sequence as described herein to provide optimal results. In one or more embodiments, processes within template module 156 may be used more than once within a current iteration in order to provide optimal results.

In one or more embodiments, template module 156 may be configured to generate one or more templates 152 wherein each template 152 may include textual data 124 associated with elements within content data 120. In one or more embodiments, template module 156 may be configured to create a plurality of templates 152 wherein each template 152 is associated with another content section 140. In one or more embodiments, template module 156 may create a plurality of templates 152 wherein more than one templates 152 may be associated with the same or similar elements of content data 120. In one or more embodiments, a user may be able to view multiple templates 152 associated with similar content sections 140, similar element of content data 120 and the like.

Still referring to FIG. 1, in one or more embodiments, template module 156 may include a large language model. In one or more embodiments, generating one or more templates 152 may include training and/or utilizing a large language model (LLM). In one or more embodiments, content data 120 may be input into the large language model in order to receive one or more templates 152. A "large language model," as used herein, is a deep learning algorithm that can recognize, summarize, translate, predict and/or generate text and other content based on knowledge gained from massive datasets. LLMs may be trained on large sets of data; for example, training sets may include greater than 1 million words. Training sets may be drawn from diverse sets of data such as, as non-limiting examples, novels, self-help books, autobiographies, biographies, blog posts, articles, emails, and the like. Training sets may include a variety of subject matters, such as, as nonlimiting examples, medical tests, novels, autobiographies, romantic ballads, beat poetry, emails, advertising documents, newspaper articles, and the like. LLMs, in some embodiments, may include GPT, GPT-2, GPT-3, and other language processing models. LLM may be used to augment the text in content data 120 based on a prompt. Training data may correlate content data 120 to plurality of prompts. A "prompt," as used herein, is a topic of focus in generating a template 152. The prompt may be any instruction to the neural network relating to the desired content or format of template 152. For example, prompt may indicate a desired reading level, a genre, a particular audience, a level of humor, a length, a style of writing, and the like. Training data may correlate elements of a dictionary related to linguistics, as described above, to a prompt. LLM may include a text prediction based algorithm configured to receive an article and apply a probability distribution to the words already typed in a sentence to work out the most likely word to come next in templates 152. For example, if the words already typed are "Nice to meet", then it is highly likely that the word "you" will come next. LLM may output such predictions by ranking words by likelihood or a prompt parameter.

For the example given above, the LLM may score "you" as the most likely, "your" as the next most likely, "his" or "her" next, and the like.

Still referring to FIG. 1, LLM may include an attention mechanism, utilizing a transformer as described further below. An "attention mechanism," as used herein, is a part of a neural architecture that enables a system to dynamically highlight relevant features of content data 120. In natural language processing this may be a sequence of textual elements. It may be applied directly to the raw input or to its higher-level representation. An attention mechanism may be an improvement to the limitation of the Encoder-Decoder model which encodes the input sequence to one fixed length vector from which to decode the output at each time step. This issue may be seen as a problem when decoding long sequences because it may make it difficult for the neural network to cope with long sentences, such as those that are longer than the sentences in the training corpus. Applying an attention mechanism, LLM may predict the next word by searching for a set of position in a source sentence where the most relevant information is concentrated. LLM may then predict the next word based on context vectors associated with these source positions and all the previous generated target words, such as textual data of a dictionary correlated to a prompt in a training data set. A "context vector," as used herein, are fixed-length vector representations useful for document retrieval and word sense disambiguation. In some embodiments, LLM may include encoder-decoder model incorporating an attention mechanism.

Still referring to FIG. 1, LLM may include a transformer architecture. In some embodiments, encoder component of LLM may include transformer architecture. A "transformer architecture," for the purposes of this disclosure is a neural network architecture that uses self-attention and positional encoding. Transformer architecture may be designed to process sequential input data, such as natural language, with applications towards tasks such as translation and text summarization. Transformer architecture may process the entire input all at once. "Positional encoding," for the purposes of this disclosure, refers to a data processing technique that encodes the location or position of an entity in a sequence. In some embodiments, each position in the sequence may be assigned a unique representation. In some embodiments, positional encoding may include mapping each position in the sequence to a position vector. In some embodiments, trigonometric functions, such as sine and cosine, may be used to determine the values in the position vector. In some embodiments, position vectors for a plurality of positions in a sequence may be assembled into a position matrix, wherein each row of position matrix may represent a position in the sequence.

With continued reference to FIG. 1, LLM and/or transformer architecture may include an attention mechanism. An "attention mechanism," as used herein, is a part of a neural architecture that enables a system to dynamically quantify the relevant features of input data and/or content data 120. In the case of natural language processing, input data and/or content data 120 may be a sequence of textual elements. It may be applied directly to the raw input or to its higher-level representation.

With continued reference to FIG. 1, an attention mechanism may represent an improvement over a limitation of the Encoder-Decoder model. The encoder-decider model encodes the input sequence to one fixed length vector from which the output is decoded at each time step. This issue may be seen as a problem when decoding long sequences because it may make it difficult for the neural network to cope with long sentences, such as those that are longer than the sentences in the training corpus. Applying an attention mechanism, LLM may predict the next word by searching for a set of position in a source sentence where the most relevant information is concentrated. LLM may then predict the next word based on context vectors associated with these source positions and all the previously generated target words, such as textual data of a dictionary correlated to a prompt in a training data set. A "context vector," as used herein, are fixed-length vector representations useful for document retrieval and word sense disambiguation.

Still referring to FIG. 1, an attention mechanism may include generalized attention self-attention, multi-head attention, additive attention, global attention, and the like. In generalized attention, when a sequence of words or an image is fed to LLM, it may verify each element of the input sequence and compare it against the output sequence. Each iteration may involve the mechanism's encoder capturing the input sequence and comparing it with each element of the decoder's sequence. From the comparison scores, the mechanism may then select the words or parts of the image that it needs to pay attention to. In self-attention, LLM may pick up particular parts at different positions in the input sequence and over time compute an initial composition of the output sequence. In multi-head attention, LLM may include a transformer model of an attention mechanism. Attention mechanisms, as described above, may provide context for any position in the input sequence. For example, if the input data and/or content data 120 is a natural language sentence, the transformer does not have to process one word at a time. In multi-head attention, computations by LLM may be repeated over several iterations, each computation may form parallel layers known as attention heads. Each separate head may independently pass the input sequence and corresponding output sequence element through a separate head. A final attention score may be produced by combining attention scores at each head so that every nuance of the input sequence is taken into consideration. In additive attention (Bandanau attention mechanism), LLM may make use of attention alignment scores based on a number of factors. These alignment scores may be calculated at different points in a neural network. Source or input sequence words are correlated with target or output sequence words but not to an exact degree. This correlation may take into account all hidden states and the final alignment score is the summation of the matrix of alignment scores. In global attention (Luong mechanism), in situations where neural machine translations are required, LLM may either attend to all source words or predict the target sentence, thereby attending to a smaller subset of words.

With continued reference to FIG. 1, multi-headed attention in encoder may apply a specific attention mechanism called self-attention. Self-attention allows the models to associate each word in the input, to other words. So, as a non-limiting example, the LLM may learn to associate the word "you", with "how" and "are". It's also possible that LLM learns that words structured in this pattern are typically a question and to respond appropriately. In some embodiments, to achieve self-attention, input may be fed into three distinct fully connected layers to create query, key, and value vectors. The query, key, and value vectors may be fed through a linear layer; then, the query and key vectors may be multiplies using dot product matrix multiplication in order to produce a score matrix. The score matrix may determine the amount of focus for a word should be put on other words (thus, each word may be a score that corresponds to other words in the time-step). The values in score matrix may be scaled down. As a non-limiting example, score matrix may be divided by the square root of the dimension of the query and key vectors. In some embodiments, the softmax of the scaled scores in score matrix may be taken. The output of this softmax function may be called the attention weights. Attention weights may be multiplied by your value vector to obtain an output vector. The output vector may then be fed through a final linear layer.

With continued reference to FIG. 1, in order to use self-attention in a multi-headed attention computation, query, key, and value may be split into N vectors before applying self-attention. Each self-attention process may be called a "head." Each head may produce an output vector and each output vector from each head may be concatenated into a single vector. This single vector may then be fed through the final linear layer discussed above. In theory, each head can learn something different from the input, therefore giving the encoder model more representation power.

With continued reference to FIG. 1, encoder of transformer may include a residual connection. Residual connection may include adding the output from multi-headed attention to the positional input embedding. In some embodiments, the output from residual connection may go through a layer normalization. In some embodiments, the normalized residual output may be projected through a pointwise feed-forward network for further processing. The pointwise feed-forward network may include a couple of linear layers with a ReLU activation in between. The output may then be added to the input of the pointwise feed-forward network and further normalized.

With continued reference to FIG. 1, transformer architecture may include a decoder. Decoder may a multi-headed attention layer, a pointwise feed-forward layer, one or more residual connections, and layer normalization (particularly after each sub-layer), as discussed in more detail above. In some embodiments, decoder may include two multi-headed attention layers. In some embodiments, decoder may be autoregressive. For the purposes of this disclosure, "autoregressive" means that the decoder takes in a list of previous outputs as inputs along with encoder outputs containing attention information from the input.

With continued reference to FIG. 1, in some embodiments, input to decoder may go through an embedding layer and positional encoding layer in order to obtain positional embeddings. Decoder may include a first multi-headed attention layer, wherein the first multi-headed attention layer may receive positional embeddings.

With continued reference to FIG. 1, first multi-headed attention layer may be configured to not condition to future tokens. As a non-limiting example, when computing attention scores on the word "am", decoder should not have access to the word "fine" in "I am fine," because that word is a future word that was generated after. The word "am" should only have access to itself and the words before it. In some embodiments, this may be accomplished by implementing a look-ahead mask. Look ahead mask is a matrix of the same dimensions as the scaled attention score matrix that is filled with "0s" and negative infinities. For example, the top right triangle portion of look-ahead mask may be filled with negative infinities. Look-ahead mask may be added to scaled attention score matrix to obtain a masked score matrix. Masked score matrix may include scaled attention scores in the lower-left triangle of the matrix and negative infinities in the upper-right triangle of the matrix. Then, when the softmax of this matrix is taken, the negative infinities will be zeroed out; this leaves "zero" attention scores for "future tokens."

With continued reference to FIG. 1, second multi-headed attention layer may use encoder outputs as queries and keys and the outputs from the first multi-headed attention layer as values. This process matches the encoder's input to the decoder's input, allowing the decoder to decide which encoder input is relevant to put a focus on. The output from second multi-headed attention layer may be fed through a pointwise feedforward layer for further processing.

With continued reference to FIG. 1, the output of the pointwise feedforward layer may be fed through a final linear layer. This final linear layer may act as a classifier. This classifier may be as big as the number of classes that you have. For example, if you have 10,000 classes for 10,000 words, the output of that class will be of size 10,000. The output of this classifier may be fed into a softmax layer which may serve to produce probability scores between zero and one. The index may be taken of the highest probability score in order to determine a predicted word.

With continued reference to FIG. 1, decoder may take this output and add it to the decoder inputs. Decoder may continue decoding until a token is predicted. Decoder may stop decoding once it predicts an end token.

With continued reference to FIG. 1, in some embodiment, decoder may be stacked N layers high, with each layer taking in inputs from the encoder and layers before it. Stacking layers may allow LLM to learn to extract and focus on different combinations of attention from its attention heads.

Still referring to FIG. 1, in some embodiments, generating template 152 may further include generating an aggregate template. An "aggregate template" is template 152 produced by the aggregation of a plurality of templates 152. Computing device 104 may be configured to generate an aggregate template from a plurality of related templates 152 generated or received by computing device 104. This may include, but is not limited to, novels, portions of novels, autobiographies and/or any other literary works. Computing device 104 may generate the aggregated template using a template classifier, language processing model, and the neural network as described above. For example, a plurality of related templates 152 may be inputted into template 152 classifier, wherein trends identified using a language processing model is part of the aggregate template training data, and template classifier is configured to output the aggregated template.

In one or more embodiments, template module 156 may further include a preference machine learning model 176 wherein the preference machine learning model 176 may receive a template 152 and modify the template 152 according to the preferences of a user. For example, preference machine learning model 176 may receive a template 152 and preference data 144, wherein preference machine learning model 176 may output modified templates 152 that contain the preference of user. In one or more embodiments, preference machine learning model 176 may create paragraphs, change a tone, setting, style and the like within template 152. In one or more embodiments, preference machine learning model 176 may be used to replace words within template 152 to words that are age specific as indicated by preference data 144. In one or more embodiments, preference machine learning model 176 may modify template 152 to address an intended audience wherein the intended audience may include particular demographics, particular age groups, particular ethnicities, particular genders and the like. In one or more embodiments, preference machine learning model 176 data may modify template 152 to create a particular layout of the literary work, such as but not limited to, book length, chapter lengths, reading level (e.g. reading level suitable for a 6-year-old, reading level suitable for a teenager and the like), content section 140 length, and the like. In one or more embodiments, preference machine learning model 176 may be trained by preference training data 180 containing a plurality of templates 152 correlated to a plurality of modified templates 152. In one or more embodiments, preference training data 180 may include a plurality of words and/or sentences correlated to a plurality of preference words and/or sentences. "Preference words and/or sentences" for the purposes of this disclosure are words and/or sentences that are categorized to a particular preference grouping. Preference groupings may include styles, tones, themes and/or any other elements within preference data 144. In one or more embodiments, words may be converted to a preference word in order to modify template 152 to reflect the preferences of the user. For example, an input such as 'cold' may be correlated to a preference word of 'frigid'. In an embodiment, preference machine learning model 176 may be used to replace words and/or sentences in order to match a writing style and/or theme as indicated by preference data 144. In one or more embodiments, outputs of preference machine learning model 176 may be received as template 152.

With continued reference to FIG. 1, processor 108 is configured to receive user feedback 184 associated with the plurality of templates 152 generated by template module 156. "User feedback" for the purposes of this disclosure is information associated with a user's interest in one or more created templates 152. In one or more embodiments, user feedback 184 may include a selection of one or more templates 152. In one or more embodiments, user feedback 184 may include an indication to recreate one or more templates 152. In one or more embodiments, user feedback 184 may include modification of one or more templates 152, such as by adding or removing portions of template 152. In one or more embodiments, a user may be dissatisfied with one or more portions of a template 152 wherein user feedback 184 may indicate to remove portions of template 152. In one or more embodiments, user feedback 184 may include feedback such as additions to content data 120 wherein the additions may be used to generate additional textual data 124 within one or more templates 152. In one or more embodiments, user feedback 184 may include information to modify preferences within preference data 144 after templates 152 have been created. In one or more embodiments, user feedback 184 may include information indicating to change preference data 144 such as a tone, demographic, setting and the like that has already been selected. In one or more embodiments, user may, through a user interface interact with templates 152 wherein a user may highlight portions of template 152 and provide user feedback 184. In one or more embodiments user feedback 184 may indicate to remove a portion of template 152, to change a tone, to add additional elements and the like. In one or more embodiments, user feedback 184 and templates 152 may be fed back into template module 156 to receive updated templates 188. In one or more embodiments, user feedback 184 may be used to modify preference data 144, content data 120 and the like wherein the modified preference data 144 and/or content data 120 may be fed into template module 156 to generate updated templates 188. In one or more embodiments, a user may delete selected portions of template 152 wherein template module 156 may use an inference engine 172 and/or one or more machine learning models to generate a coherent template 152 following the deletions. In one or more embodiments, user feedback 184 may include feedback to change one or more preferences of template 152 wherein template module 156 may utilize preference machine learning model 176 to modify one or more portions of template 152. In one or more embodiments, template module 156 may utilize user feedback 184 to generate one or more updated templates 188. In one or more embodiments, one or more machine learning models may further be configured to receive user feedback 184 wherein the machine learning models may generate updated template 188 as a function of the template 152 and user feedback 184. In one or more embodiments, template 152 may be continuously fed into template module 156 to generate updated template 188 until user feedback 184 is no longer input. In one or more embodiments, user feedback 184 may be provided more than once wherein template 152 may be fed into template module 156 more than once. In one or more embodiments, user feedback 184 may be received on each template 152, wherein only templates 152 receiving user feedback 184 may be modified with template module 156. In one or more embodiments, one or more templates 152 may be fed and/or inputs into to template module 156 wherein template module 156 may determine any modified transitions 168 as a function of user feedback 184 wherein the modified transitions 168 provide for consistency following modifications to template 152. In one or more embodiments, template 152 and user feedback 184 may be input into template module 156 to receive updated templates 188. In one or more embodiments, updated templates 188 may again be input into template module 156 in order to modify updated templates 188 based on new user feedback 184. In one or more embodiments, templates 152 and/or updated template 188 may be continuously input into template module 156 until a desired template 152 or templates 152 is created. In one or more embodiments, processor 108 may generate one or more updated templates 188 as a function of user feedback 184.

With continued reference to FIG. 1, processor 108 may be configured to create a user interface data structure. As used in this disclosure, "user interface data structure" is a data structure representing a specialized formatting of data on a computer configured such that the information can be effectively presented for a user interface. User interface data structure may include templates 152, updated templates 188 and the like.

With continued reference to FIG. 1, processor 108 may be configured to transmit the user interface data structure to a graphical user interface. Transmitting may include, and without limitation, transmitting using a wired or wireless connection, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. Processor 108 may transmit the data described above to database 116 wherein the data may be accessed from database 116. Processor 108 may further transmit the data above to a device display or another computing device 104.

With continued reference to FIG. 1, apparatus may include a graphical user interface 192 (GUI). For the purposes of this disclosure, a "user interface" is a means by which a user and a computer system interact. For example, through the use of input devices and software. In some cases, processor 108 may be configured to modify graphical user interface as a function of the one or more templates 152 by populating user interface data structure with one or more templates 152 and visually presenting the one or more templates 152 through modification of the graphical user interface. A user interface may include graphical user interface, command line interface (CLI), menu-driven user interface, touch user interface, voice user interface (VUI), form-based user interface, any combination thereof and the like. In some embodiments, a user may interact with the user interface using a computing device 104 distinct from and communicatively connected to processor 108. For example, a smart phone, smart tablet, or laptop operated by the user and/or participant. A user interface may include one or more graphical locator and/or cursor facilities allowing a user to interact with graphical models and/or combinations thereof, for instance using a touchscreen, touchpad, mouse, keyboard, and/or other manual data entry device. A "graphical user interface," as used herein, is a user interface that allows users to interact with electronic devices through visual representations. In some embodiments, GUI 192 may include icons, menus, other visual indicators, or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in graphical user interface. Persons skilled in the art, upon reviewing the entirety of this disclosure, will be aware of various ways in which a graphical user interface and/or elements thereof may be implemented and/or used as described in this disclosure.

With continued reference to FIG. 1, apparatus may further include a display device communicatively connected to at least a processor 108. "Display device" for the purposes of this disclosure is a device configured to show visual information. In some cases, display device may include a liquid crystal display (LCD), a cathode ray tube (CRT), a plasma display, a light emitting diode (LED) display, and any combinations thereof. Display device may include, but is not limited to, a smartphone, tablet, laptop, monitor, tablet, and the like. Display device may include a separate device that includes a transparent screen configured to display computer generated images and/or information. In some cases, display device may be configured to visually present one or more data through GUI 192 to a user, wherein a user may interact with the data through GUI 192. In some cases, a user may view GUI 192 through display.

With continued reference to FIG. 1, processor 108 is configured to generate an integrated data file 194 as a function of the updated template 188. "Integrated data file" for the purposes of this disclosure is one or more updated templates 188 that have been combined to create a single unified literary work. For example, integrated data file 194 may include a story wherein each template 152 and/or updated template 188 may include a portion of the story. In one or more embodiments, integrated data file 194 may include an autobiography, a fictional story, a nonfictional story, a research paper and the like wherein each updated template 188 includes a portion of the story. In one or more embodiments, processor 108 may generate a plurality of templates 152 wherein each template 152 may include a portion of single literary work. In one or more embodiments, the single literary work may include chapters, page numbers, paragraphs, sentences and the like. In one or more embodiments, the single unified literary work may include themes, tones, settings and the like as indicated by preference data 144. In one or more embodiments, integrated data file 194 may include templates 152 for each content section 140, such as for example, a template 152 for the explosion, a template 152 for the rising action, a template 152 for the climax, a template 152 for the falling action and a template 152 for the conclusion. Similarly, integrated fata file may include a template 152 for each content section 140 such as the abstract, introduction, method, results discussion and the like. In one or more embodiments, processor 108 may generate more than one templates 152 for each content section 140 wherein a user may select, through user feedback 184, a template 152 for each content section 140. In one or more embodiments, integrated data file 194 may include the selected templates 152 for each section. In one or more embodiments, processor 108 may combine templates 152 and/or updated templates 188 to generate integrated data file 194. In one or more embodiments, processor 108 may be configured to input integrated data file 194 into inference engine 172, such as inference engine 172 as described above, in order to ensure that there is coherency and consistency throughout integrated data file 194. In one or more embodiments, each template 152 may include textual data 124 wherein processor 108 may be configured to combine the textual data 124 into a single digital file. In one or more embodiments, integrated data file 194 may include a plurality of digital pages, wherein processor 108 may be configured to generate page numbers for each digital page within integrated data file 194.

With continued reference to FIG. 1, processor 108 may be configured to receive a ranking for each template 152 and/or each updated template 188. In one or more embodiments, rankings may be received from template module 156. In one or more embodiments, template structure may include a ranking for each template 152 and/or updated template 188 wherein processor 108 may be configured to generate integrated data file 194 as a function of the ranking. For example, template 152 ranked first within template structure may be placed first within integrated data file 194, a template 152 ranked second may be placed immediately after the template 152 ranked first and so on. In one or more embodiments, integrated data file 194 may include one or more templates 152 and/or updated templates 188 wherein the templates 152 and/or updates templates 152 are placed in numerical order passed on their ranking.

With continued reference to FIG. 1, processor 108 may be configured to retrieve a plurality of content producers 196. "Content producer" for the purposes of this disclosure is information associated with a person or entity that has the capabilities of producing, manufacutirng, or distributing one or more formats of integrated data file 194. In one or more embodiments, content producer 196 may include a publisher, an online marketplace, a manufacturer of physical books, a producer of digital book and/or literary works and the like. In one or more embodiments, the one or more formats may include a digital format wherein integrated data file 194 may be produced, manufactured and/or distributed within a PDF (Portable Document Format, an EPUB (Electronic publication), a MOBI (Mobi Pocket), an AZW (Amazon Kindle eBook Format), an iBooks and the like. In one or more embodiments, one or more formats may include a physical format, wherein integrated data file 194 is produced in a physical form. In one or more embodiments, the physical format may include printed pages. In one or more embodiments, the physical format may include a bound book. In one or more embodiments, content producer 196 may contain the capabilities to produce physical formats of a wide variety of literary works such as, but not limited to, children's books, adult novels, research papers and the like. In one or more embodiments, content producer 196 may contain the means to distribute a physical version of integrated data file 194. For example, content producer 196 may contain a website in which individuals can purchase integrated data file 194 and receive a physical copy. In one or more embodiments content producer 196 may include entities that can sell physical copies of integrated data file 194 on an online marketplace. In one or more embodiments, content producer 196 may include an entity capable of printing and manufacturing physical books.

With continued reference to FIG. 1, content producer 196 may include information about the producer such as but not limited, an address of business, agents working on behalf of the entity and the like. In one or more embodiments, content producer 196 may include file type requirements wherein each content producer 196 may require a differing file format in order to produce integrated file. For example, a first content producer 196 may require integrated data file 194 to be submitted in a PDF format, whereas a second content producer 196 may require integrated data file 194 to be in a DOC or DOCX format. In one or more embodiments, each content producer 196 may have various requirements such as page sizes within integrated data file 194, font requirements, the presence of page breaks, the presence of paragraph breaks, the presence of chapter breaks, line spacing, margins, document formats, and the like. In one or more embodiments, content producer 196 may further include pricing such as the price to produce a physical format of a book, a price per page, a cost to sell the physical book, a percentage for selling each book, a price per book based on a specified quantity, an average time to produce and manufacture and the like.

Worth continued reference to FIG. 1, the plurality of content producers 196 may be retrieved from database 116, wherein database 116 is populated with a plurality of content producers 196. In one or more embodiments, database 116 may continuously and/or systematically update database 116 with additional content producer 196 or modify existing content producers 196 to reflect changes associated with content producer 196. In one or more embodiments, database 116 may be continuously and/or systemically updated by individuals who own or operate apparatus. In one or more embodiments, database 116 may be continuously and/or systematically updated using a WebCrawler. A "web crawler," as used herein, is a program that systematically browses the internet for the purpose of Web indexing. The web crawler may be seeded with platform URLs, wherein the crawler may then visit the next related URL, retrieve the content, index the content, and/or measures the relevance of the content to the topic of interest. In some embodiments, computing device 104 may generate a web crawler to retrieve content producers 196. In one or more embodiments, processor 108 may continuously update database 116 in order to provide accurate information associated with one or more content producers 196. The web crawler may be seeded and/or trained with websites, such as websites of content producers 196, websites associated with content producers 196 (e.g. such as digital marketplaces and the like). In some embodiments, the web crawler may be trained with information received from a user through a user interface. In some embodiments, the web crawler may be configured to generate a web query. A web query may include search criteria received from a user. For example, a user may submit a plurality of websites for the web crawler to search to extract any data suitable for processing.

With continued reference to FIG. 1, processor 108 may be configured to generate a plurality of content producers 196. In one or more embodiments, generating may include retrieving content producers 196 from database 116. In one or more embodiments, generating may include retrieving content producers 196 that are capable of producing integrated data file 194 based on geographical datum 128. For example, processor 108 may select content producers 196 that are capable of producing integrated data file 194 within a geographic area. In one or more embodiments, a user, through user input may indicate a preferred time of completion wherein the preferred time of completion indicates a time and date as to when user would like to receive one or more formats of integrated data file 194. In one or more embodiments, processor 108 may select content producers 196 based on their manufacturing and production times as indicated by information within content producer 196. In one or more embodiments, processor 108 may rank one or more content producers 196 based on pricing, manufacturing time and the like. In one or more embodiments, processor 108 may select content producers 196 based on their capabilities to generate specific formats of integrated data file 194 as indicated by user input. In one or more embodiments, processor 108 may be configured to receive a selection of one or more content producers 196. In one or more embodiments, user may interact with user interface wherein user may select one or more content producers 196. In one or more embodiments, processor 108 may be configured to transmit integrated data file 194 to one or more content producers 196. In one or more embodiments, processor 108 may be configured to transmit integrated data file 194 to one or more content producers 194 based on a selection made by user, a selection made by computing device 104 and the like. In one or more embodiments, processor 108 may be configured to modify a file format of integrated data file 194 based on the requirements of a select content producer 196. For example, processor 108 may convert integrated data file 194 from a text file to a PDF. In one or more embodiments, processor 108 may be configured to insert page breaks, paragraph breaks, fonts and the like. in one or more embodiments, processor 108 may utilize one or more programming languages to find and replace fonts, insert paragraph breaks, page breaks, page numbering and/or any other requirements needed to produce integrated data file 194 for one or more content producers 196. In one or more embodiments, processor 108 may modify integrated data file 194 to generate one or more modified integrated data files 198. In one or more embodiments, each content producer 196 may contain a unique modified integrated data file 198 that conforms to the requirements of the content producer 196. In one or more embodiments, each modified integrated data file 198 may include a literary work that is suitable for processing by one or more content providers. In one or more embodiments, each content provider may include contact information, an address and the like wherein processor 108 may be configured to transmit modified integrated data file 198 to one or more content producers 196. In one or more embodiments, processor 108 may submit portions of user profile as described above to content producer 196 along with modified integrated data file 198 in order to indicate the source of the modified integrated data file 198. In one or more embodiments, processor 108 may use one or more web automation tools to populate websites associated with content producers 196 wherein populating may include inputting modified integrated data file 198 into one or more forms on the websites of content producers 196. In one or more embodiments, processor 108 may use user profile to fill out forms on websites associated with content producers 196 in order to submit a request to produce modified integrated data file 198. In one or more embodiments, user may select more than one content producers 196 wherein processor 108 may generate modified integrated data file 198 for each content producer 196 of the more than one content producers 196 and submit the modified integrated data files 198 to the content producers 196. In one or more embodiments, processor 108 may be configured to submit multiple requests on a single click. In one or more embodiments, generating of modified integrated data file 198 may allow for quick and efficient modification of integrated data file 194 to be transmitted to one or more content producers 196. In one or more embodiments, generation of modified integrated data file 198 may allow for minimization of errors, inconsistencies and the like. In one or more embodiments, generation of multiple modified integrated data files 198 may allow users to submit their works to one or more content producers 196 without having to manually reach content producers 196, research requirements, research location, modify files and the like.

With continued reference to FIG. 1, processor 108 may be configured to generate outreach data for integrated data file 194 and/or modified integrated data file 198. "Outreach data" for the purposes of this disclosure is information relating to the outreach of individual who may be interested in integrated data file. In one or more embodiments, outreach data may include marketing material such as posters, fliers and the like. In one or more embodiments, outreach data may include marketing material such as talking points for podcasts, blog articles, and the like. In one or more embodiments, outreach data may include information associated with content data 120 and/or integrated data file 194 wherein the information is generated in a podcast format, a blog format, as an article and the like. In one or more embodiments, outreach data may include a review or a summary of integrated data file 194. In one or more embodiments, outreach data may include posters and/or fliers that may be used to promote integrated data file 194 to prospective individuals. In one or more embodiments, processor 108 may receive outreach text and generate outreach data. "Outreach text" for the purposes of this disclosure is outreach data in written format. In one or more embodiments, a user may input outreach text through one or more input devices wherein processor 108 may generate outreach data. In one or more embodiments, processor 108 may receive outreach text through a plurality of responses given to a user from a plurality of questions that have been given to the user. the plurality of questions may be pre-generated and retrieved from database 116. In on one or more embodiments, processor 108 may receive outreach text using a chatbot system 148 as described above. In one or more embodiments, a user may the particular type of outreach data that they would like to generated. For example, a user may indicate that they would like a newspaper article to be generated, a social media post to be generated, talking points for a podcast to be generated and the like. In one or more embodiments, outreach text may include the intended audience, the points the user would like to include the length of the textual data within outreach data and the like. In one or more embodiments, outreach text may be used to as a plurality of constraints for a machine learning model and/or an LLM wherein the plurality of constraints may narrow the type of output in which the user is seeking. For example, a user may limit the length of outreach data, limit the complexity of words, limit the intended audience and the like. In one or more embodiments, outreach text may limit outputs wherein outreach text may indicate the particular type of data that should be generated such as blog post, a newspaper article, a social media post and the like. In one or more embodiments, outreach data may include graphical visualizations, images, posters and the like containing outreach text. In one or more embodiments, outreach data may include editable forms wherein each editable form contains outreach text. "Editable form" for the purposes of this disclosure is a pre-generated file in which words can be added. For example, editable form may include an editable poster for events wherein textual data may be added to create posters and/or flyers. In one or more embodiments, database 116 may include a plurality of editable forms wherein several editable forms may be selected to generate outreach data. In one or more embodiments, a machine learning model may be trained with training data having a plurality of outreach text correlated to a plurality of editable forms wherein outreach text may be correlated to one or more editable forms. In one or more embodiments, processor 108 may select an editable form and populate it to generate a poster and/or flyer. In one or more embodiments, the poster or flyer may be generated as outreach data. In one or more embodiments, processor may receive elements of outreach text from content profile and/or user profile. In one or more embodiments, user profile may contain the availability of a user (e.g. such as available dates and times for events, meetings and the like) wherein processor 108 may receive the availability of the user as outreach text. In one or more embodiments, processor may receive outreach text form integrated data file 194 wherein processor 108 may grab element of integrated data file such as a book title, chapter names, author names and the like and input them into outreach text. In one or more embodiments, elements of outreach data may be generated as a function of user input. In one or more embodiments, processor may receive an input or a prompt from a user wherein the input or prompt may be associated with a request to generate dialogue. In one or more embodiments, the input or request may include requests to generate blog articles, generate talking points for a podcast and the like. In one or more embodiments, processor 108 may use one or more language models and/or text generation models to generate talking points for a podcast, blog articles and/or textual data. In one or more embodiments, the language models may be trained on textual data wherein the language models may receive a prompt and generate outputs.

With continued reference to FIG. 1, processor 108 and/or template module 156 may be configured to receive content data and/or outreach text and generate outreach data. In one or more embodiments, processor 108 and/or template module 156 may receive integrated data file as an input and output outreach data. In one or more embodiments processor and/or template module 156 may utilize the LLM in order to generate outreach data. In one or more embodiments, the LLM may receive content data 120, outreach text and/or integrated data file 194 and output outreach text as an input. In one or more embodiments, the LLM may be trained with a plurality of articles, blog posts, podcast talking points and the like wherein the LLM may convert any inputs into outreach data. In one or more embodiments inputs may be converted into a podcast format, an article format and the like using the LLM. In one or more embodiments, the LLM may highlight relevant features of the inputs received using an attention mechanism as described above. In one or more embodiments, the LLM may receive a sequence of textual elements using the attention mechanism wherein the LLM may generate text for outreach data. In one or more embodiments, generating outreach data may include generating aggregate outreach data wherein aggregate outreach data is generated by an aggregation of a plurality of blog posts, articles, and the like. In one or more embodiments, processor 108 and/or template module 156 may aggregate a plurality of blogs, articles, outreach data, and the like and classify them ton one or more outreach categorizations. In one or more embodiments, processor and/or content module may classify inputs as described above to one or more outreach categorizations using any classifier as described in this disclosure wherein outputs may include similarly classified elements. In one or more embodiments, outreach categorizations may include categorization such as podcast talking points, blogs, newspaper articles, social media posts and the like wherein training data containing similar outreach categorizations may be used to generate outputs such as outreach data. In one or more embodiments outreach categorization may further be based on genre, talking audiences, literary styles and the like.

Figure 2:
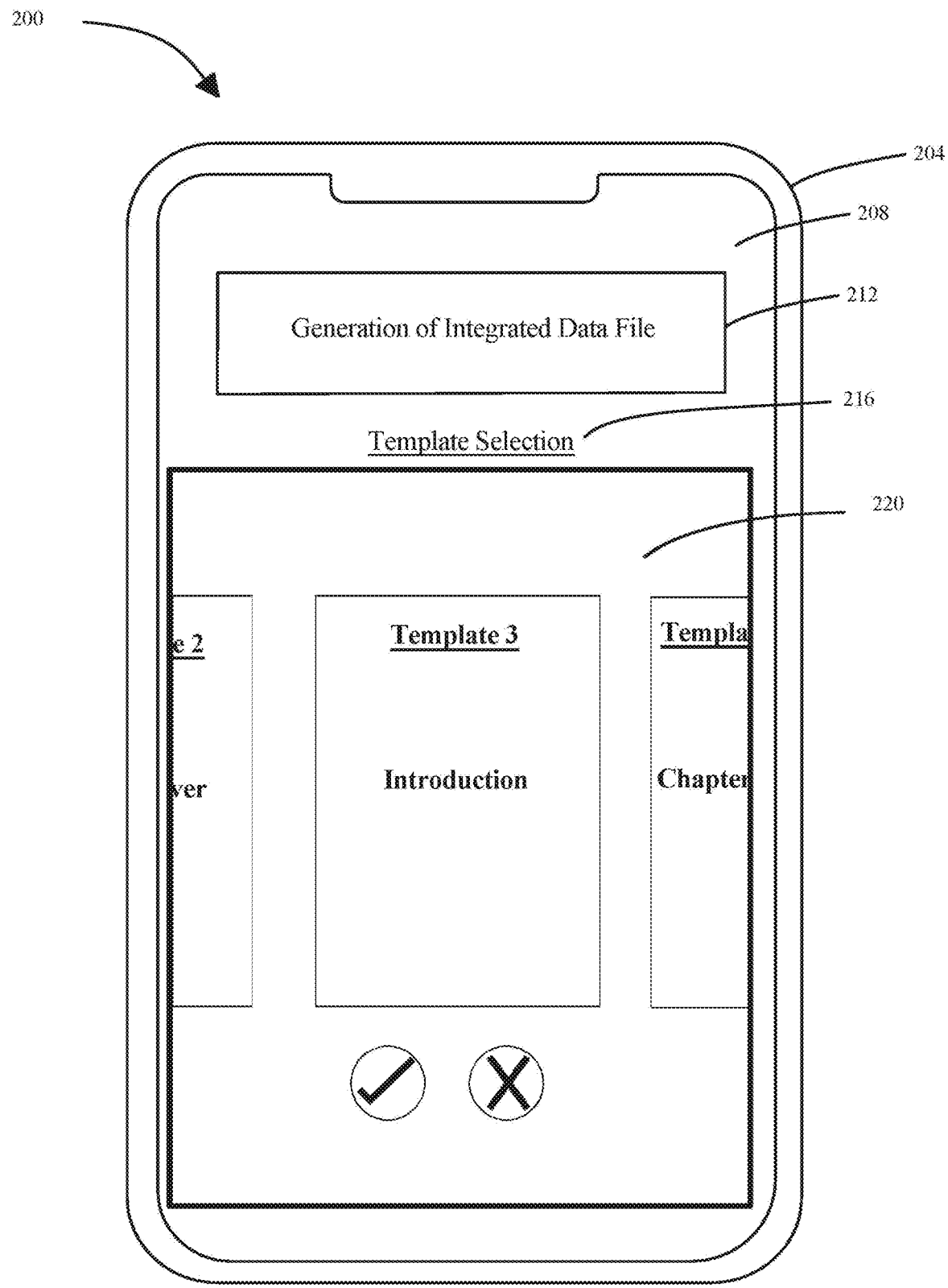
FIG. 2 is an exemplary embodiment of a graphical user interface in accordance with this disclosure.

Referring now to FIG. 2, an exemplary embodiment of a GUI 200 on a display device 204 is illustrated. GUI 200 is configured to receive the user interface structure as discussed above and visually present any data described in this disclosure. Display device 204 may include, but is not limited to, a smartphone, tablet, laptop, monitor, tablet, and the like. Display device 204 may further include a separate device that includes a transparent screen configured to display computer generated images and/or information. In some cases, GUI 200 may be displayed on a plurality of display devices. In some cases, GUI 200 may display data on separate windows 208. A "window" for the purposes of this disclosure is the information that is capable of being displayed within a border of device display. A user may navigate through different windows 208 wherein each window 208 may contain new or differing information or data. For example, a first window 208 may display information relating to projected carbon emissions, whereas a second window may display information relating to the real carbon data as described in this disclosure. A user may navigate through a first second, third and fourth window (and so on) by interacting with GUI 200. For example, a user may select a button or a box signifying a next window on GUI 200, wherein the pressing of the button may navigate a user to another window. In some cases, GUI may further contain event handlers, wherein the placement of text within a textbox may signify to computing device to display another window. An "event handler" as used in this disclosure is a callback routine that operates asynchronously once an event takes place. Event handlers may include, without limitation, one or more programs to perform one or more actions based on user input, such as generating pop-up windows, submitting forms, requesting more information, and the like. For example, an event handler may be programmed to request more information or may be programmed to generate messages following a user input. User input may include clicking buttons, mouse clicks, hovering of a mouse, input using a touchscreen, keyboard clicks, an entry of characters, entry of symbols, an upload of an image, an upload of a computer file, manipulation of computer icons, and the like. For example, an event handler may be programmed to generate a notification screen following a user input wherein the notification screen notifies a user that the data was properly received. In one or more embodiments, user input may include an input of freight data associated with transport request. In one or more embodiments, a user may interact with GUI 200 to input freight data for transport. In some embodiments, an event handler may be programmed to request additional information after a first user input is received. In some embodiments, an event handler may be programmed to generate a pop-up notification when a user input is left blank. In some embodiments, an event handler may be programmed to generate requests based on the user input. In this instance, an event handler may be used to navigate a user through various windows 208 wherein each window 208 may request or display information to or from a user. In this instance, window 208 displays an identification field 212 wherein the identification field signifies to a user, the particular action/computing that will be performed by a computing device. In this instance identification field 212 contains information stating "generation of integrated data files" wherein a user may be put on notice that any information being received or displayed will be used generate templates. Additionally, in this instance, window 208 may display a sub identification field 216 wherein the sub identification field 216 may indicate to a user the type of data that is being displayed or the type of data that is being received. In this instance, sub identification field 216 contains "template selection". This may indicate to a user that computing device is displaying templates to a user to select. Additionally, window 208 may contain interface feature 220 wherein a user may select templates in a visually pleasing way through interface feature 220. In one or more embodiments, a user may swipe and/or scroll through various templates wherein a user may accept or reject them. In one or more embodiments, rejected templates may be fed back into template module as described above in order to create updated templates. In one or more embodiments, accepted templates may then be used to create integrated data file wherein a user may be presented with a digital version of their literary work.

Figure 3:
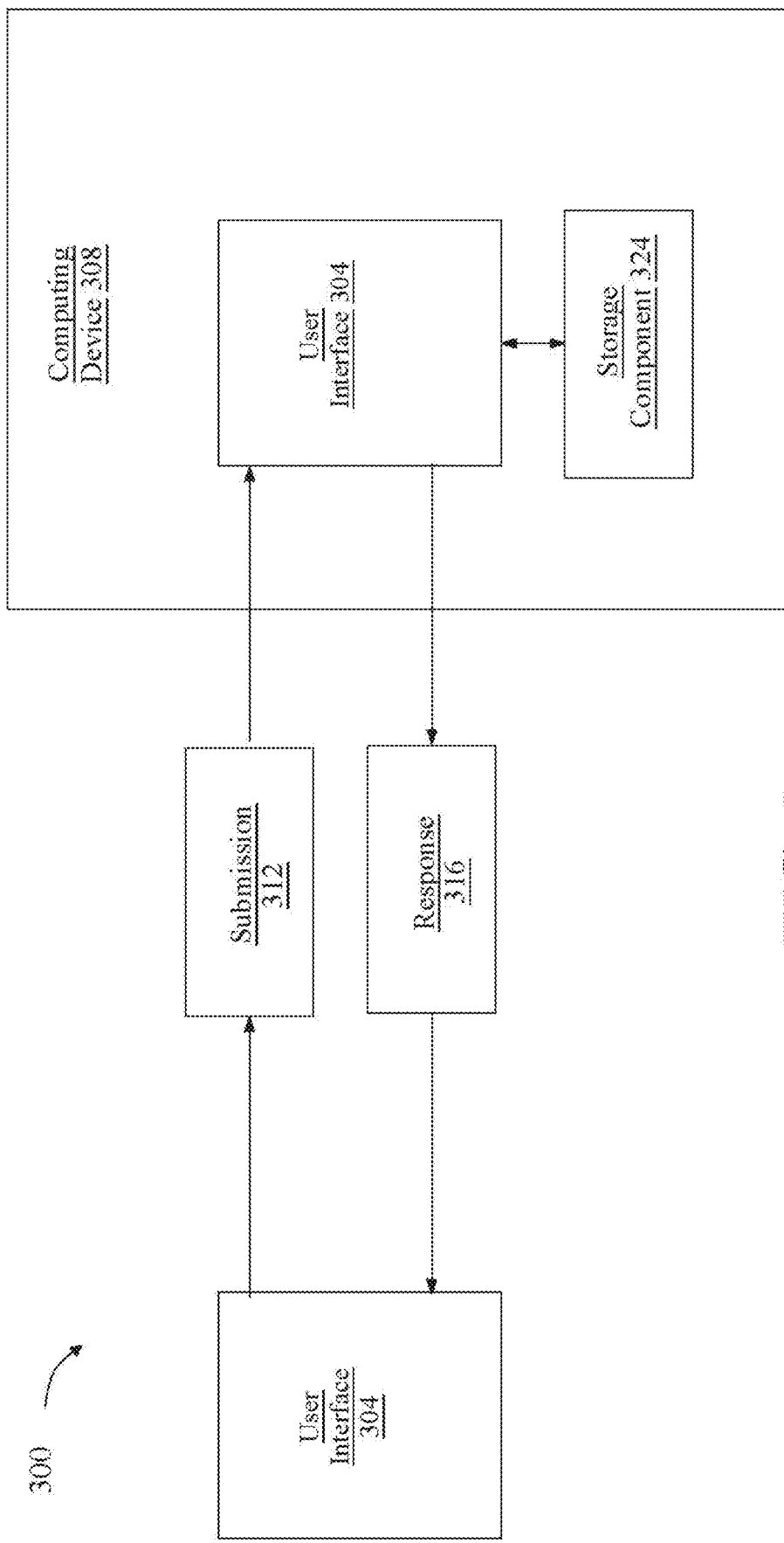
FIG. 3 is a block diagram of exemplary embodiment of a chatbot.

Referring to FIG. 3, a chatbot system 300 is schematically illustrated. According to some embodiments, a user interface 304 may be communicative with a computing device 308 that is configured to operate a chatbot. In some cases, user interface 304 may be local to computing device 308. Alternatively or additionally, in some cases, user interface 304 may remote to computing device 308 and communicative with the computing device 308, by way of one or more networks, such as without limitation the internet. Alternatively or additionally, user interface 304 may communicate with user device 308 using telephonic devices and networks, such as without limitation fax machines, short message service (SMS), or multimedia message service (MMS). Commonly, user interface 304 communicates with computing device 308 using text-based communication, for example without limitation using a character encoding protocol, such as American Standard for Information Interchange (ASCII). Typically, a user interface 304 conversationally interfaces a chatbot, by way of at least a submission 312, from the user interface 308 to the chatbot, and a response 316, from the chatbot to the user interface 304. In many cases, one or both of submission 312 and response 316 are text-based communication. Alternatively or additionally, in some cases, one or both of submission 312 and response 316 are audio-based communication.

Continuing in reference to FIG. 3, a submission 312 once received by computing device 308 operating a chatbot, may be processed by a processor 320. In some embodiments, processor 320 processes a submission 312 using one or more of keyword recognition, pattern matching, and natural language processing. In some embodiments, processor employs real-time learning with evolutionary algorithms. In some cases, processor 320 may retrieve a pre-prepared response from at least a storage component 324, based upon submission 312. Alternatively or additionally, in some embodiments, processor 320 communicates a response 316 without first receiving a submission 312, thereby initiating conversation. In some cases, processor 320 communicates an inquiry to user interface 304; and the processor is configured to process an answer to the inquiry in a following submission 312 from the user interface 304. In some cases, an answer to an inquiry present within a submission 312 from a user device 304 may be used by computing device 104 as an input to another function, for example without limitation at least a feature or at least a preference input.

Figure 4:
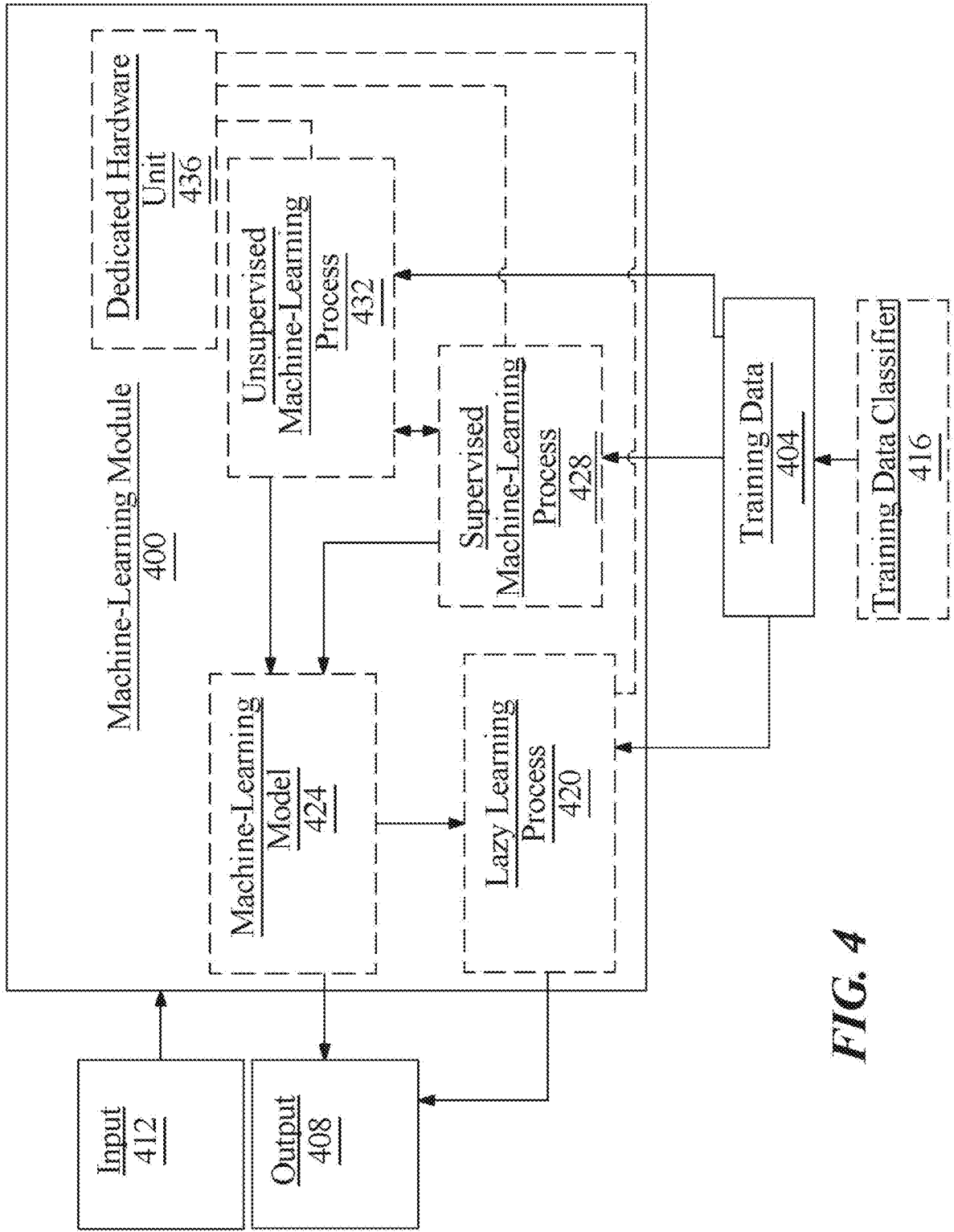
FIG. 4 is a block diagram of exemplary embodiment of a machine learning module.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm instantiated in hardware or software logic, data structures, and/or functions that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example inputs may include any inputs as described in FIG. 1, such as but not limited to content data, preference data, textual data, templates, updated templates and the like. Outputs may include, but are not limited to, templates, updated templates and the like.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to content sections. In one or more embodiments, elements of content data may be separated into one or more content sections wherein each output of one or more machine learning models may be associated with the content section. For example, a machine learning model as described in FIG. 1, may generate a template for each content section categorization. In one or more embodiments, categorization of content sections may allow for processing of smaller data sets. In one or more embodiments, categorization of content sections may allow for particular outputs to be used. For example, training data may output templates associated with an introduction of a literary work in instances where a particular content section includes an introduction of a literary work. In one or more embodiments, inputs and outputs of training data may be classified to content sections wherein an input such as content data or elements thereof may be correlated with an input having the same content categorization. in one or more embodiment, classification may allow for quicker processing, more accurate results and the like.

With further reference to FIG. 4, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 4, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value.

As a non-limiting example, and with further reference to FIG. 4, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 4, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 4, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include inputs such as but not limited to content data, preference data, templates, updated templates and the as described above as inputs, outputs such as but not limited to, templates updates templates and the like as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

With further reference to FIG. 4, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 4, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 432 may not require a response variable; unsupervised processes 432 may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 4, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 4, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 4, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 4, one or more processes or algorithms described above may be performed by at least a dedicated hardware unit 436. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 436 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 436 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 436 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 5:
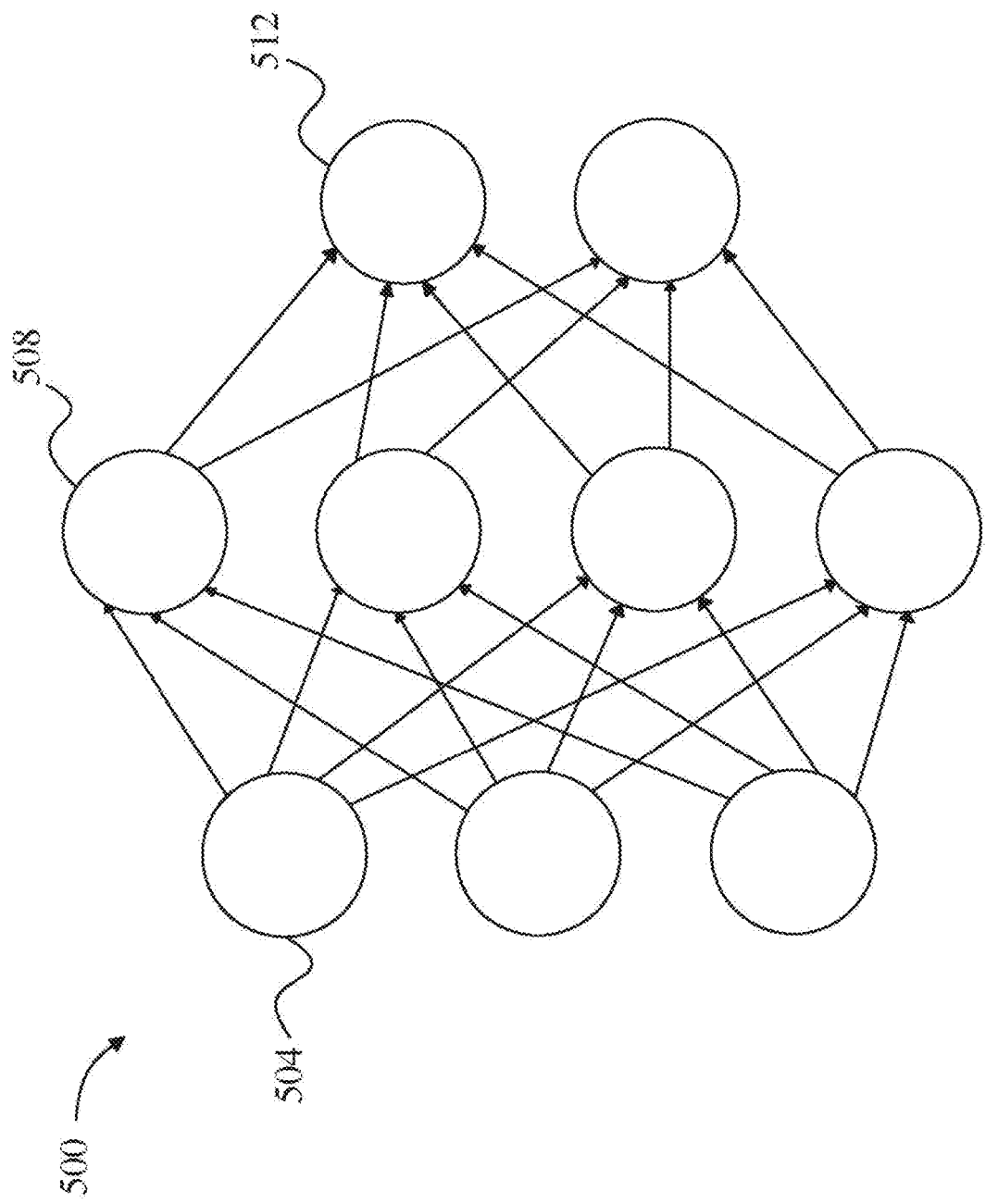
FIG. 5 is a diagram of an exemplary embodiment of a neural network.

Referring now to FIG. 5, an exemplary embodiment of neural network 500 is illustrated. A neural network 500 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 504, one or more intermediate layers 508, and an output layer of nodes 512. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 6:
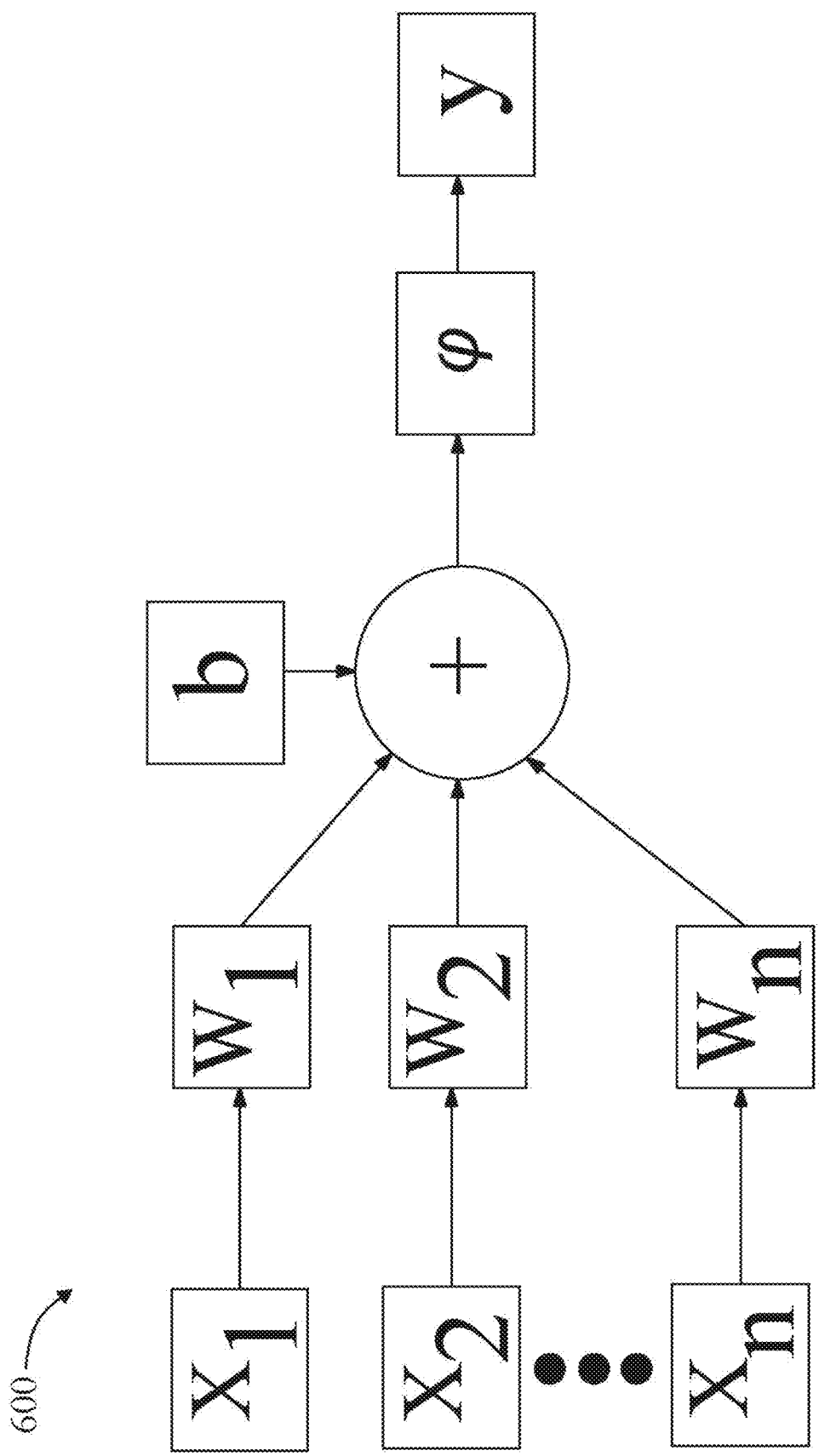
FIG. 6 is a block diagram of an exemplary embodiment of a node of a neural network.

Referring now to FIG. 6, an exemplary embodiment of a node 600 of a neural network is illustrated. A node may include, without limitation a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1-e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0,x)$, a "leaky" and/or "parametric" rectified linear unit function such as $f(x)=\max(ax,x)$ for some $\alpha$, an exponential linear units function such as $$f(x) = \begin{cases} x & \text{for } x \geq 0 \\ \alpha(e^x - 1) & \text{for } x < 0 \end{cases}$$

for some value of $\alpha$ (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 7:
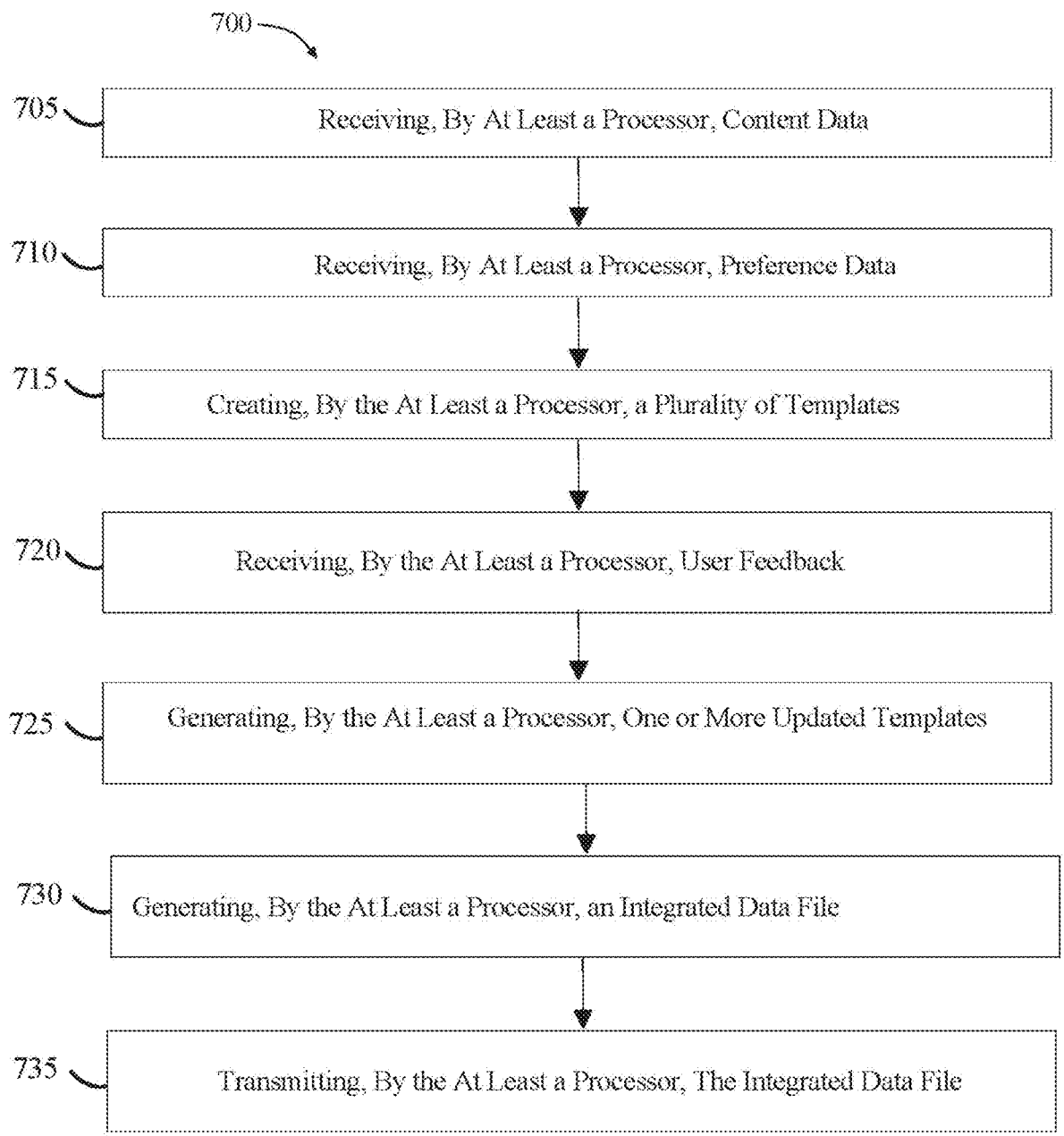
FIG. 7 is a flow diagram illustrating an exemplary embodiment of a method for generation of an integrated data file.

Referring now to FIG. 7, a method 700 for generation of an integrated data file is described. At step 705, method 700 includes receiving, by at least a processor, content data from a user. In one or more embodiments, the content data includes image data and receiving, by the at least a processor, the plurality of content data further includes classifying the image data using an image classifier including interpolating the image data to a desired pixel count required by the image classifier as a function of a machine learning model, generating textual data as a function of the interpolation and the image classifier, and classifying the textual data to one or more content sections. In one or more embodiments, receiving, by the at least a processor, the content data includes classifying the content data one or more content sections. In one or more embodiments, content data may include audio data. In one or more embodiments, receiving content data may include receiving content data from a microphone wherein the content data includes audio data. This may be implemented within reference to FIGS. 1-7 and without limitation.

With continued reference to FIG. 7, at step 710 method 700 includes receiving, by the at least a processor, preference data from the user as a function of receipt of the content data. in one or more embodiments, receiving, by the at least a processor, the preference data includes receiving the preference data using a chatbot system. This may be implemented within reference to FIGS. 1-7 and without limitation.

With continued reference to FIG. 7, at step 715 method 700 includes creating, by the at least a processor, a plurality of templates as a function of the preference data and the content data. In one or more embodiments, creating, by the at least a processor, the plurality of templates as a function of the preference data and the plurality of content data includes creating one or more templates for each content section of the one or more content sections. In one or more embodiments, creating by the at least a processor, the plurality of templates as a function of the preference data and the plurality of content data includes generating a transition between one or more elements of content data using a template module, and generating a template as a function of the content data and the transition between the one or more elements of content data and as a function of a machine learning model. In one or more embodiments, generating the transition between one or more elements of content data using the template module includes generating the transition between the one or more elements of content data using an inference engine. This may be implemented within reference to FIGS. 1-7 and without limitation.

With continued reference to FIG. 7, at step 720 method 700 includes receiving, by the at least a processor, user feedback associated with the plurality of templates. This may be implemented within reference to FIGS. 1-7 and without limitation.

With continued reference to FIG. 7, at step 725 method 700 includes generating, by the at least a processor, one or more updated templates as function of the user feedback and the plurality of templates. This may be implemented within reference to FIGS. 1-7 and without limitation.

With continued reference to FIG. 7, at step 730 method 700 includes generating, by the at least a processor, an integrated data file as a function of one or more updated templates. In one or more embodiments, generating, by the at least a processor, the integrated data file includes receiving a ranking of each of the one or more updated templates and generating the integrated data file as a function of the ranking, wherein the integrated data file includes one or more updated templates. This may be implemented within reference to FIGS. 1-7 and without limitation.

With continued reference to FIG. 1, at step 735, method 700 includes transmitting, by the at least a processor, the integrated data file to one or more content producers. In one or more embodiments, transmitting, by the at least a processor, the integrated data file to one or more content producers includes generating a plurality of content producers, generating a modified integrated data file for at least one content producer of the plurality of content producers, and transmitting the modified integrated data file to the at least one content producer. In one or more embodiments, the content data includes a geographical datum and generating the plurality of content producers includes generating the plurality of content producers as a function of the geographical datum. This may be implemented within reference to FIGS. 1-7 and without limitation.

It is to be noted that any one or more of the aspects and embodiments described herein may be conveniently implemented using one or more machines (e.g., one or more computing devices 104 that are utilized as a user computing device 104 for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device 104) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory 112 "ROM" device, a random access memory 112 "RAM" device, a magnetic card, an optical card, a solid-state memory 112 device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory 112. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device 104) and any related information (e.g., data structures and data) that causes the machine to perform any one of the methodologies and/or embodiments described herein.

Examples of a computing device 104 include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device 104 may include and/or be included in a kiosk.

Figure 8:
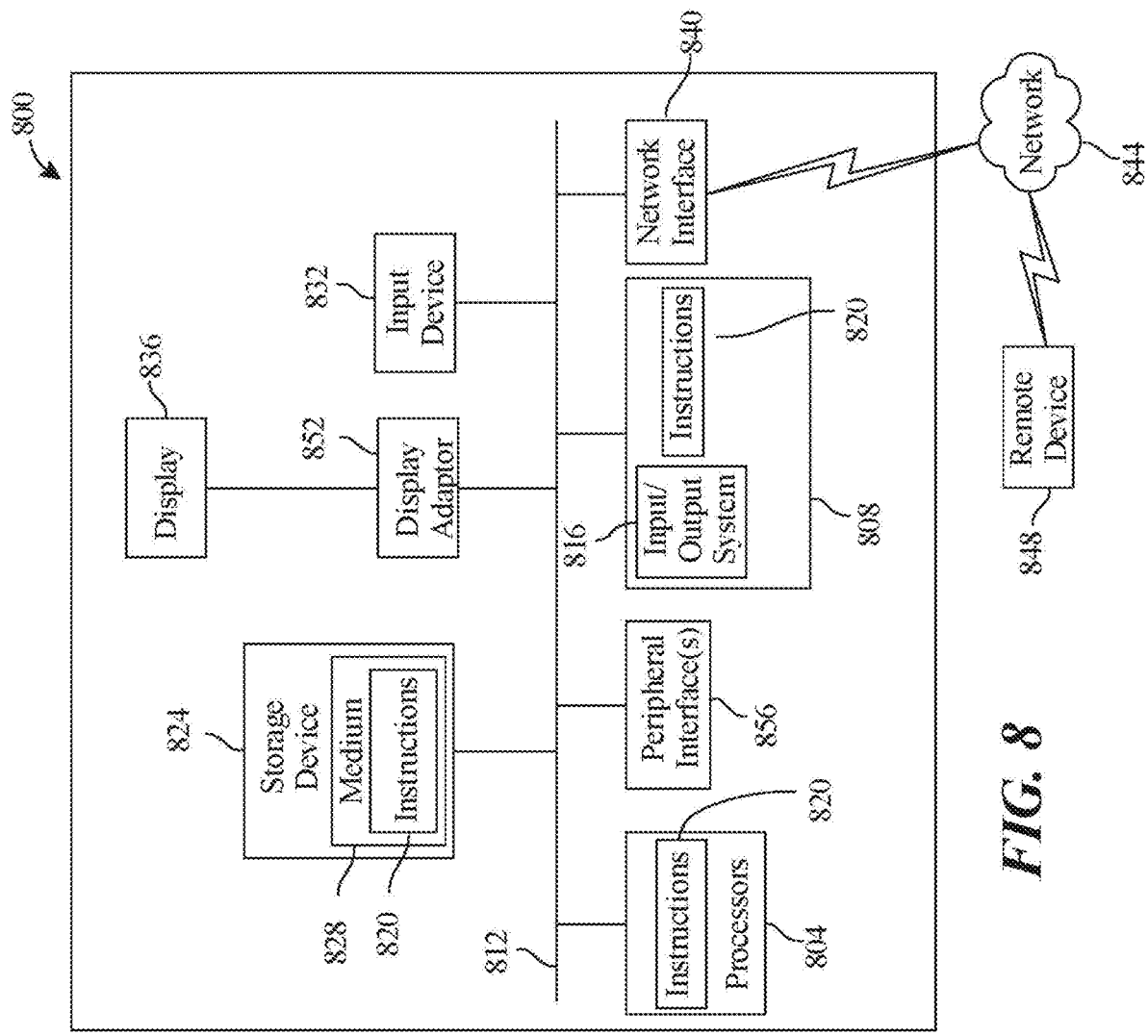
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices 104, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, apparatuses and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for generation of an integrated data file, wherein the apparatus comprises:
   at least a processor; and a memory communicatively connected to the at least a processor, the memory containing instructions configuring the at least a processor to:
  receive content data from a user;
  receive preference data from the user as a function of receipt of the content data;
  create a plurality of templates as a function of the preference data and the content data;
  train a preference machine learning model iteratively with preference training data, wherein the preference training data correlates a plurality of semantic data to a plurality of preference semantic data;
  modify the plurality of templates as a function of the preference machine learning model and the preference data, wherein outputs of the preference machine learning model are iteratively added to the plurality of templates;
  receive user feedback associated with the modified plurality of templates;
  generate one or more updated templates as function of the user feedback and the modified plurality of templates, wherein the user feedback and the modified plurality of templates are fed back into the preference machine learning model continuously to generate the one or more updated templates until no new user feedback is inputted;
  generate an integrated data file as a function of the one or more updated templates; and
  transmit the integrated data file to one or more content producers.

2. The apparatus of claim 1, wherein receiving content data from a user comprises receiving the content data from a microphone, wherein the content data comprises audio data.

3. The apparatus of claim 1, wherein:
  the content data comprises image data; and
  receiving content data further comprises classifying the image data using an image classifier comprising:
    interpolating the image data to a desired pixel count required by the image classifier as a function of a machine learning model;
    generating textual data as a function of the interpolation and the image classifier;
    and classifying the textual data to one or more content sections.

4. The apparatus of claim 1, wherein receiving, by the at least a processor, the content data comprises classifying the content data to one or more content sections.

5. The apparatus of claim 4, wherein creating the plurality of templates as a function of the preference data and the content data comprises creating one or more templates for each content section of the one or more content sections.

6. The apparatus of claim 5, wherein creating a plurality of templates as a function of the preference data and the content data comprises:
  generating a transition between one or more elements of content data using a template module;
  and generating a template as a function of the content data and the transition between the one or more elements of content data and as a function of a machine learning model.

7. The apparatus of claim 5, wherein generating the transition between one or more elements of content data using the template module comprises generating the transition between the one or more elements of content data using an inference engine.

8. The apparatus of claim 1, wherein generating the integrated data file comprises:
  receiving a ranking of each of the one or more updated templates; and
  generating the integrated data file as a function of the ranking, wherein the integrated data file comprises the one or more updated templates.

9. The apparatus of claim 1 wherein transmit the integrated data file to one or more content producers comprises:
  generating a plurality of content producers;
  generating a modified integrated data file for at least one content producer of the plurality of content producers; and
  transmitting the modified integrated data file to the at least one content producer.

10. The apparatus of claim 9, wherein:
  the content data comprises a geographical datum; and
  generating the plurality of content producers comprises generating the plurality of content producers as a function of the geographical datum.

11. A method for generation of an integrated data file, wherein the method comprises:
  receiving, by at least a processor, content data from a user;
  receiving, by the at least a processor, preference data from the user as a function of receipt of the content data;
  creating, by the at least a processor, a plurality of templates as a function of the preference data and the content data;
  training a preference machine learning model iteratively with preference training data, wherein the preference training data correlates a plurality of semantic data to a plurality of preference semantic data;
  modifying the plurality of templates as a function of the preference machine learning model and the preference data, wherein outputs of the preference machine learning model are iteratively added to the plurality of templates;
  receiving, by the at least a processor, user feedback associated with the plurality of modified templates;
  generating, by the at least a processor, one or more updated templates as function of the user feedback and the plurality of modified templates, wherein the user feedback and the modified plurality of templates are fed back into the preference machine learning model continuously to generate the one or more updated templates until no new user feedback is inputted;
  generating, by the at least a processor, an integrated data file as a function of the one or more updated templates;
  and transmitting, by the at least a processor, the integrated data file to one or more content producers.

12. The method of claim 11, wherein receiving, by the at least a processor, the content data comprises receiving content data from a microphone, wherein the content data comprises audio data.

13. The method of claim 11, wherein:
  the content data comprises image data; and
  receiving, by the at least a processor, the plurality of content data further comprises classifying the image data using an image classifier comprising:
    interpolating the image data to a desired pixel count required by the image classifier as a function of a machine learning model;
    generating textual data as a function of the interpolation and the image classifier;
    and classifying the textual data to one or more content sections.

14. The method of claim 11, wherein receiving, by the least a processor, the content data comprises classifying the content data to one or more content sections.

15. The method of claim 14, wherein creating, by the at least a processor, the plurality of templates as a function of the preference data and the plurality of content data comprises creating one or more templates for each content section of the one or more content sections.

16. The method of claim 15, wherein creating by the at least a processor, the plurality of templates as a function of the preference data and the plurality of content data comprises:
generating a transition between one or more elements of content data using a template module;
and generating a template as a function of the content data and the transition between the one or more elements of content data and as a function of a machine learning model.

17. The method of claim 15, wherein generating the transition between one or more elements of content data using the template module comprises generating the transition between the one or more elements of content data using an inference engine.

18. The method of claim 11, wherein generating, by the at least a processor, the integrated data file comprises:
receiving a ranking of each of the one or more updated templates; and
generating the integrated data file as a function of the ranking, wherein the integrated data file comprises one or more updated templates.

19. The method of claim 11 wherein transmitting, by the at least a processor, the integrated data file to one or more content producers comprises:
generating a plurality of content producers;
generating a modified integrated data file for at least one content producer of the plurality of content producers; and
transmitting the modified integrated data file to the at least one content producer.

20. The method of claim 19, wherein:
the content data comprises a geographical datum; and
generating the plurality of content producers comprises generating the plurality of content producers as a function of the geographical datum.

\* \* \* \* \*